United States Patent [19]

Carleton et al.

[11] Patent Number: 4,855,903
[45] Date of Patent: Aug. 8, 1989

[54] TOPOLOGICALLY-DISTRIBUTED-MEMORY MULTIPROCESSOR COMPUTER

[75] Inventors: Herbert R. Carleton, Setauket; Jeremy Q. Broughton, Stony Brook, both of N.Y.

[73] Assignee: State University of New York, Albany, N.Y.

[21] Appl. No.: 147,595

[22] Filed: Jan. 22, 1988

Related U.S. Application Data

[63] Continuation of Ser. No. 684,250, Dec. 20, 1984, abandoned.

[51] Int. Cl.⁴ ............................................. G06F 15/16
[52] U.S. Cl. ............................ 364/200; 364/228.7; 364/228.9; 364/231.9; 364/238.1
[58] Field of Search ... 364/200 MS File, 900 MS File

[56] References Cited

U.S. PATENT DOCUMENTS

| | | | |
|---|---|---|---|
| 3,287,703 | 11/1966 | Slotnick | 364/200 |
| 3,308,436 | 3/1967 | Borck, Jr. et al. | 364/200 |
| 3,506,934 | 2/1971 | Ernst et al. | 340/172.5 |
| 3,984,819 | 10/1976 | Anderson | 364/200 |
| 4,051,551 | 9/1977 | Lawrie et al. | 364/200 |
| 4,065,808 | 12/1977 | Schomberg et al. | 364/200 |
| 4,092,728 | 5/1978 | Baltzer | 364/900 |
| 4,101,960 | 7/1978 | Stokes et al. | 364/200 |
| 4,251,861 | 2/1981 | Mago | 364/200 |
| 4,276,594 | 6/1981 | Morley | 364/200 |
| 4,309,691 | 1/1982 | Castleman | 364/200 |
| 4,344,134 | 8/1982 | Barnes | 364/200 |
| 4,365,292 | 12/1982 | Barnes et al. | 364/200 |
| 4,380,046 | 4/1983 | Fung | 364/200 |
| 4,400,768 | 8/1983 | Tomlinson | 364/200 |
| 4,466,064 | 8/1984 | Martin | 364/200 |
| 4,503,534 | 3/1985 | Budde et al. | 364/200 |
| 4,507,726 | 3/1985 | Grinberg et al. | 364/200 |
| 4,514,807 | 4/1985 | Nogi | 364/200 |
| 4,523,273 | 6/1985 | Adams, III et al. | 364/200 |
| 4,550,437 | 10/1985 | Kobayashi et al. | 364/200 |
| 4,553,203 | 11/1985 | Rav et al. | 364/200 |
| 4,562,539 | 12/1985 | Vince | 364/200 |
| 4,591,980 | 5/1986 | Huberman et al. | 364/200 |
| 4,591,981 | 5/1986 | Kassabov | 364/200 |
| 4,653,642 | 9/1985 | Hansen | 364/900 |
| 4,709,327 | 11/1987 | Hillis et al. | 364/200 |

FOREIGN PATENT DOCUMENTS 0077835 5/1983 European Pat. Off.
58-159169 9/1983 Japan.

OTHER PUBLICATIONS

"Data Routing and Transpositions in Processor Arrays" by C. R. Jesshope, ICL Technical Journal, vol. 2, No. 2, Nov. 1980, pp. 191–206.
"Reduction of Connection for Multibus Organization" by T. Lang et al., IEEE Transactions on Computers, vol. C-32, No. 8, Aug. 1983, pp. 707–716.
"Multiple-Read Single-Write Memory and its Applications" by L. Chang, IEEE Transactions on Computers, vol C-29, No. 8, Aug. 1980, pp. 689–694.

(List continued on next page.)

Primary Examiner—Gareth D. Shaw
Assistant Examiner—Kevin A. Kriess
Attorney, Agent, or Firm—Morgan & Finnegan

[57] ABSTRACT

A modular, expandable, topologically-distributed-memory multiprocessor computer comprises a plurality of non-directly communicating slave processors under the control of a synchronizer and a master processor. Memory space is partitioned into a plurality of memory cells. Dynamic variables may be mapped into the memory cells so that they depend upon processing in nearby partitions. Each slave processor is connected in a topologically well-defined way through a dynamic bi-directional switching system (gateway) to different respective ones of the memory cells. Access by the slave processors to their respective topologically similar memory cells occurs concurrently or in parallel in such a way that no data-flow conflicts occur. The topology of data distribution may be chosen to take advantage of symmetries which occur in broad classes of problems. The system may be tied to a host computer used for data storage and analysis of data not efficiently processed by the multiprocessor computer.

45 Claims, 14 Drawing Sheets

OTHER PUBLICATIONS

"Two-Dimensional Microprocessor Pipelines for Image Processing" by R. Roesser, IEEE Transactions on Computers, vol C-27, No. 2, Feb. 1978, pp. 144–156.

Manuel, et al., *Electronics (four articles), Jun. 16, 1983, pp. 105–114.*

"Design and Simulation of an MC68000-based Multi-Processor System", by J. Kuehn et al. Proceedings of the 1982 International Conference on Parallel Processing, 24th–27th Aug. 1982, pp. 353–362.

"Doubly Twisted Torus Networks for VLSI Processor Arrays", by C. Sequin, the 8th Annual Symposium on Computer Archecture, Minn., May 12–14, 1981, pp. 353–362.

"On the Mapping Problem", by S. Bokhari Proceedings of the 1979 International Conference on Parallel Processing, 21st–24th Aug. 1979, pp. 239–248.

KEY:
○ SLAVE PROCESSOR
☐ MEMORY CELL
⬡ BIDIRECTIONAL CONTROLLED PATHWAY

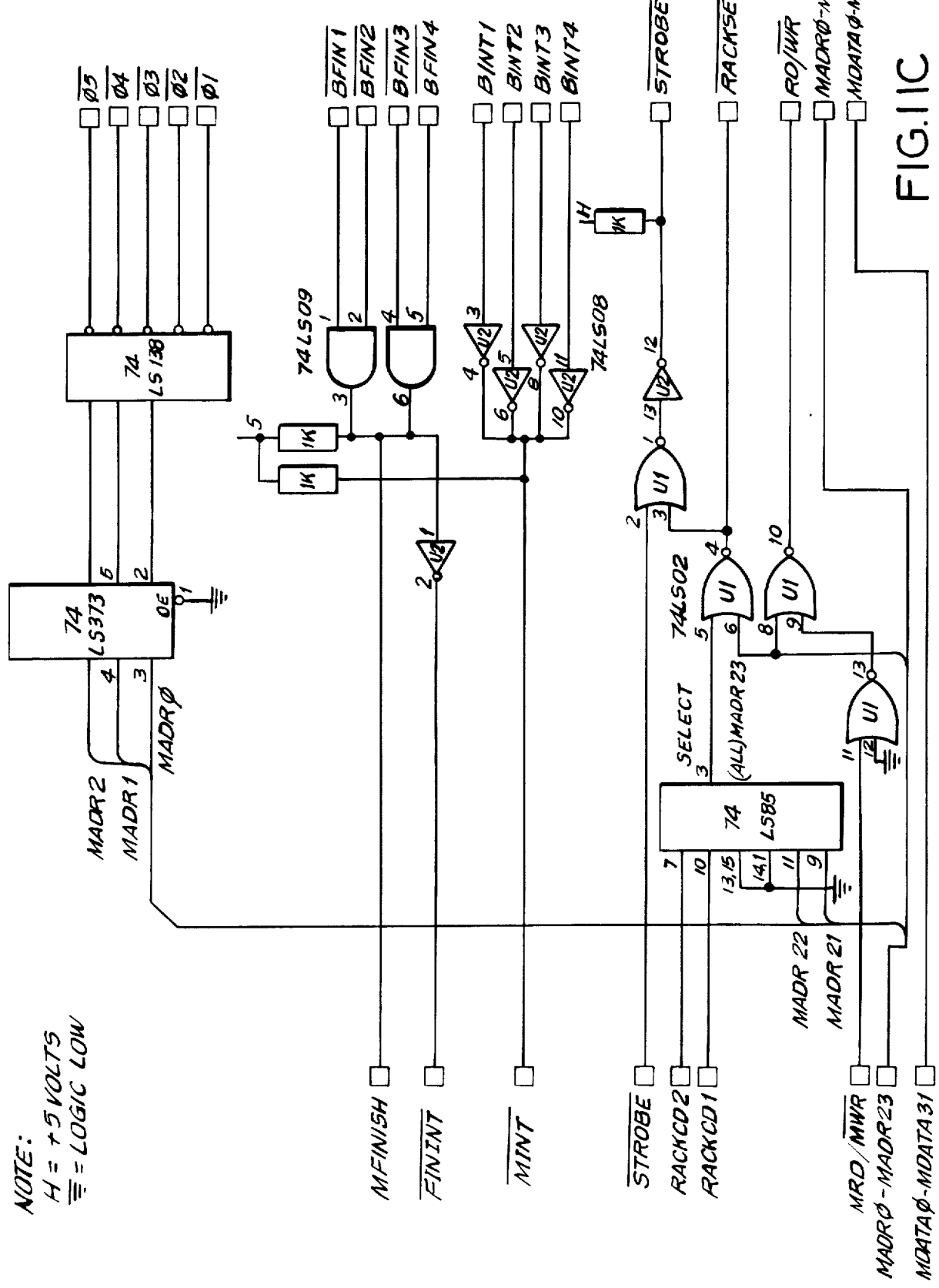

TOPOLOGICALLY-DISTRIBUTED-MEMORY MULTIPROCESSOR COMPUTER

This is a continuation of co-pending application Ser No. 684,250, filed on Dec. 20, 1984, now abandoned.

BACKGROUND OF THE INVENTION

The invention pertains to electronic computers. More particularly, the invention pertains to multiprocessor computers utilizing parallel processing techniques.

Parallel and concurrent processing techniques have been the subject of much theoretical and practical research and development. One reason is that for many classes of problems, e.g. those with large numbers of interacting variables, parallel processing can offer significantly improved performance efficiencies in comparison with traditional sequential processing techniques. Although most, if not all, complex computational problems susceptible of solution could eventually be solved using conventional sequential processing machines, the time ordinarily required to solve these complex problems can be prohibitive.

A survey of several known parallel and concurrent processing techniques may be found in the June 16, 1983 edition of *Electronics* (McGraw-Hill) at pages 105-114. The article first describes, at page 105, the "classic von Neumann" sequential processing architecture wherein a single processor is fed a single stream of instructions with the order of their execution controlled by a program counter. This classic architecture is commonly discussed as being a major bottleneck for high-speed processing.

A variety of approaches are discussed in the Electronics article for departing from the von Neumann architecture. These approaches include those which use a few very fast or specialized processors and then enhance the control-flow architecture with well-known techniques such as pipelining or vectorizing.

Another approach discussed in the *Electronics* article, at page 106, is to take a large number of fast or medium-speed processors and arrange them in parallel—perhaps putting several hundred on a single wafer. One known parallel processing architecture is called data-flow. According to the *Electronics* report, data-flow is a concept for controlling the execution of computer instructions such that they are executed as soon as the input data they require is available. No program counter need be used. Data-flow machines reportedly automatically exploit the parallelism inherent in many problems because all instructions for which data is available can be executed simultaneously, assuming the availability of sufficient numbers of processors.

Several data-flow-type research projects are discussed at pages 107-110 of the *Electronics* article. One such project is called "Cedar" which utilizes a two-level multiprocessor design. The top level reportedly comprises processor clusters interconnected by a global switching network wherein control is handled by a global control unit using data-flow techniques. At the second level, each processor cluster has local memories and processors interconnected through a local network and controlled, in a conventional von Neumann fashion, with a cluster control unit.

The Illiac IV, which comprised a parallel array of 64 processing units and a Burroughs 6700 control computer is another well-known, albeit commercially unsuccesful, parallel processing project. The machine was designed to process 64 words in parallel but suffered in that it could not get the desired operands in and out of the processing elements (PEs) fast enough.

Researchers at the University of Texas in Austin reportedly have produced a prototype TRAC (Texas Reconfigurable Array Computer) machine based on dynamically coupling processors, input/output units, and memories in a variety of configurations using an intelligent switching network.

Other known parallel processing projects reported in the *Electronics* magazine article, at page 108, include the Blue CHiP (Configurable Highly Parallel Computer) project at Purdue University in Indiana. In the Blue CHiP project, a collection of homogenous processing elements (PEs) are placed at regular intervals in a lattice of programmable switches. Each PE is reportedly a computer with its own local memory.

Another Purdue University project is known as PASM and focuses on a partitionable array single-instruction-multiple-data and multiple-instruction-multiple-data (SIMD-MIMD) computer. The PASM machine reportedly can be dynamically reconfigured into one or more machines.

Mago, at the University of North Carolina, has designed a binary tree computer with processors at the leaves and resource controllers at the interior nodes and root. The processor cells are reportedly connected directly to their immediate neighbors to facilitate data movement within the linear array. (See page 109 of the *Electronics* article.)

Denelcor, Inc. of Aurora, Colo., reportedly has developed an AGP system whose architecture sits between von Neumann and data-flow. (*Electronics*, Feb. 24, 1982, page 161; *Electronics*, June 16, 1983, page 110.) The AGP system is reportedly a multiprocessor with up to 16 process/execution modules (PEMs) and a shared memory within each PEM. Cooperating programs are pipelined to allow many of them to execute concurrently.

Although many previous attempts have been made to construct multiprocessor systems in order to achieve high computational throughout, these efforts have in general been applied to the designs of general purpose machines (GPMs), with their attendant problems of interprocessor interferences and consequent failure to achieve the expected speed. See, V. Zakharov, *IEEE Transactions on Computers*, 33, (1984), p. 45. With such GPM systems, processor-processor protocols are very complex since the problem to be solved is (from the designer's point of view) unknown.

Machines to handle large Monte Carlo lattice gas systems in the field of materials analysis have been built. (See, H. J. Hilhorst, A. F. Bakker, C. Bruin, A Compagner and A. Hoogland, *J. Stat. Phys.*, In Press.) Further, at least two molecular dynamics (MD) machines have been designed; one at Delft and the other in England. Two design concepts have been employed: the Dutch machine can be viewed as a single-processor but simultaneous-tasking. Data is pipelined through it very rapidly. The British machines have used 4,096 processors (the ICL DAP)—each element of which is slow and has narrow communication paths. The sheer number of elements provides the speed These machines have a very high performance/cost ratio. They are cheap but achieve speed similar to that of a CRAY for the particular algorithm for which they are built. Since they are dedicated machines, they are used 24 hours a day giving them effectively 24 times the throughput of a CRAY (assuming a lucky CRAY user can get 1 hour CPU time a day). On the other hand, although these machines have proved the potential effectiveness of algorithm oriented machines (AOMs), the MD processors have design limitations. For example, in the case of the ICL DAP, not all algorithms (the MD and Monte Carlo simulations included) may be completely parallelized and the bottleneck in the speed becomes the non-parallel part which has to be performed in a conventional sequential manner. In the case of the Delft machine, the design flaw is that the power of the machine is fixed. Unless many of the machines are put in parallel, the power does not scale with system size; and it is by no means obvious how to do this since the problem then becomes memory-fetch limited. The only way to increase speed in such systems is to spend more money on faster components within the pipeline, where the price will increase rapidly. The other disadvantage of this architecture is that since the algorithm is hardwired, the machine is computationally and algorithmically inflexible. For example, running a three-body force calculation would require a major redesign of the system There has also been some patent activity in the multi-processing field.

U.S. Pat. No. 4,092,728 to Baltzer (May 30, 1978) entitled "Parallel Access Memory System" describes a memory system having contiguous storage locations which are partitioned into discrete areas such that several independent processors have exclusive control of their respective memory locations. The processors, in one embodiment, are connected to their respective memory locations through a switching system, or gateway. Baltzer does not disclose a problem solving computer, but rather an information processor for use, e.g., in a television.

U.S. Pat. No. 4,344,134 to Barnes (Aug. 10, 1982) entitled "Partitionable Parallel Processor" describes a system wherein a network of processors operate more or less simultaneously in order to reduce overall program execution time. Specifically, the Barnes patent discloses a hierarchy of processors which operate on discrete units of extended memory based upon preassigned allocations. The mapping scheme is stated by Barnes to be "relatively unimportant to the basic operation" of the U.S. Pat. No. 4,344,134 disclosure.

U.S. Pat. No. 4,074,072 to Christensen et al (Feb. 14, 1978) entitled "Multiprocessor Control of a Partitioned Switching Network By Control Communication Through the Network" discloses a partitioned switching network which is divided into plural edge-to-edge partitions, each partition being controlled by a separate processor coupled to a discrete block of the network. The processors communicate with one another through the network for controlling interpartition calls U.S. Pat. No. 4,251,861 to Mago (Feb. 17, 1981) entitled "Cellular Network of Processors" describes an information handling system for parallel evauaIation of applicative expressions formed from groups of subexpressions. A plurality of interconnected cells, each containing at least one processor, is established in a tree structure. Logic means are provided for connecting the processors within the cells to form disjoint assemblies of the processors, the logic means being responsive to the applicative expression to partition the plurality of interconnected cells into separate disjoint assemblies of processors in which subexpressions can be evaluated. Input/output means are also provided for entering applicative expressions into the cells and for removing results from the cells after evaluation of the applicative expressions. The system disclosed is stated to accommodate unbounded parallelism which permits execution of many user programs simultaneously.

U.S. Pat. No. 4,276,594 to Morley (June 30, 1981) entitled "Digital Computer with Multi-Processor Capability Utilizing Intelligent Composite Memory and Input/Output Modules and Method for Performing the Same" discloses a digital computer with the capability of incorporating multiple central processing units utilizing an address and data bus between each CPU and from one to fifteen intelligent composite memory and input/output modules. The disclosure is concerned with data transfer between input/output devices and the CPUs or external devices.

U.S. Pat. No. 4,281,391 to Huang (July 28, 1981) entitled "Number Theoretic Processor" discloses modular arithmetic processors constructed from networks of nodes. The nodes perform various processes such as encoding, modular computation, and radix encoding/conversion. Nodal functions are performed in a parallel manner. The Huang system utilizes table look-up to perform the modular arithmetic. The tables may be stored in memory and the nodes may comprise a microprocessor.

U.S. Pat. No. 4,101,960 to Stokes et al (July 18, 1978) entitled "Scientific Processor" discloses a single-instruction-multiple-data (SIMD) processor which comprises a front end processor and a parallel task processor. The front end processor sets up a parallel task for the parallel task processor and causes the task to be stored in memory. The parallel processor then executes its task independently of the front end processor.

U.S. Pat. No. 4,051,551 to Lawrie et al (Sept. 27, 1977) entitled "Multidimensional Parallel Access Computer Memory System" discloses a parallel access computer memory system comprising a plurality of memory modules, a plurality of processing units, an alignment means for aligning the individual processing units to the individual memory modules in a non-conflicting manner, and means for associating the individual processing units with respective memory modules.

No known prior art parallel processing system takes full advantage of the topology of memory space. However, in many classes of problems, e.g. materials analysis, artificial intelligence, image analysis, solution of differential equations and many defense applications, data processing techniques seek to simulate interactions between variables whose values depend quite closely on the attributes and values of their near neighbors in the simulated system. It is thus desirable, in a concurrent or parallel processing environment, to assign related variables to common processors in order to speed processing. Particularly, it would be advantageous, although no known prior system has done so, to be able to map multi-dimensional simulated systems into partitioned two-dimensional memory space in such a way that the dynamic variables are partitioned based on their dependency to what happens in nearby partitions.

Once data has thus been mapped into "contiguous" partitions, parallel or concurrent processing may then be carried out upon the individual memory partitions using a plurality of processors, each associated with given partitions.

Even though memory may be partitioned in such a way that related variables are stored in the same partition for processing by a dedicated processor, there will undoubtedly be a need to communicate the results of such intra-partition processing to either other dedicated processors or to a master-controller processor for, e.g., sequential processing of the data and for eventual transmission to the user. Although it is possible to conceive routines whereby the dedicated processors communicate with one another and monitor the processing, such interprocessor communications can degrade system performance and result in lost data processing time as the dedicated processors communicate with one another.

Furthermore, the mapping of variables into individual memory partitions to take account of the dependencies therebetween should not ignore the overall dependencies of the system variables upon one another. For example, in a materials analysis simulation, it may be envisioned that a three-dimensional space can be broken down into various memory partitions such that the dynamic variables within each partition depend closely on the values of other such variables within the partition. However, the effect of the individual variables upon the memory space as a whole—particularly upon variables stored within other partitions—is critical to the overall completion of the simulation. Efficiencies in handling such inter-partition dependencies can result in extraordinary savings in processing overhead and hence result in tremendous savings in the most important of all computer processing factors—time.

It is therefore an object of the invention to provide a superfast multiprocessor parallel processing computer.

It is another object of the invention to provide a superfast multiprocessor computer which can operate in concurrent processing or parallel processing modes.

It is another object of the invention to provide a multiprocessor parallel processing computer which takes advantage of the parallelism inherent in many classes of computing problems.

It is another object of the invention to provide a parallel processing computer which takes full advantage of the topology of memory space.

It is a further object of the invention to provide a parallel processing computer in which it is possible to usefully partition dynamic variables so that they depend on what happens in nearby partitions.

It is a further object of the invention to provide a parallel processing computer which allows access by a plurality of processors to a plurality of memory partitions in parallel and in such a way that no data-flow conflicts occur.

It is a further object of the invention to provide a parallel processing computer which is relatively easy to program.

It is a still further object of the invention to provide a parallel processing computer which is modular in design and easily upgradeable, allowing the power of the machine to scale with the size of the problem.

It is a still further object of the invention to provide a multiprocessor parallel processing system wherein a three-dimensional problem may be projected into a two-dimensional space which is in turn mapped into memory/processor space.

It is a still further object of the invention to provide a computer which meets all of the above criteria while remaining low in cost.

SUMMARY OF THE INVENTION

These and other objects of the invention are met by providing a modular, synchronized, topologically-distributed-memory multiprocessor computer comprising non-directly communicating slave processors under the control of a synchronizer and a master processor and a partitionable memory space wherein each slave processor is connected in a topologically well-defined way through a dynamic bi-directional switching system (gateway) to different respective memory areas. The topology of memory space may be planned to take advantage of symmetries which occur in many problems. Access day the slave processors to partioned, topologically similar memory cells occurs in parallel and in such a way that no data-flow conflicts occur. The invention provides particular advantage in processing information and handling problems in which it is possible to partition dynamic variables so that they depend on what happens in nearby partitions. The system may be tied to a host machine used for data storage and analysis of data not efficiently allowed by the parallel multiprocessing architecture. The archicteture is modular, easily upgradeable, and may be implemented at a relatively low cost

BRIEF DESCRIPTION OF THE DRAWINGS

The invention will be described more fully below by way of reference to the following drawings, in which:

FIG. 11C is a partial circuit diagram of a synchronizer board useful in an apparatus according to the invention;

FIG. 11D is a partial circuit diagram of an instruction decoder useful in an apparatus according to the invention.

DETAILED DESCRIPTION OF THE DRAWINGS

Figure 1:
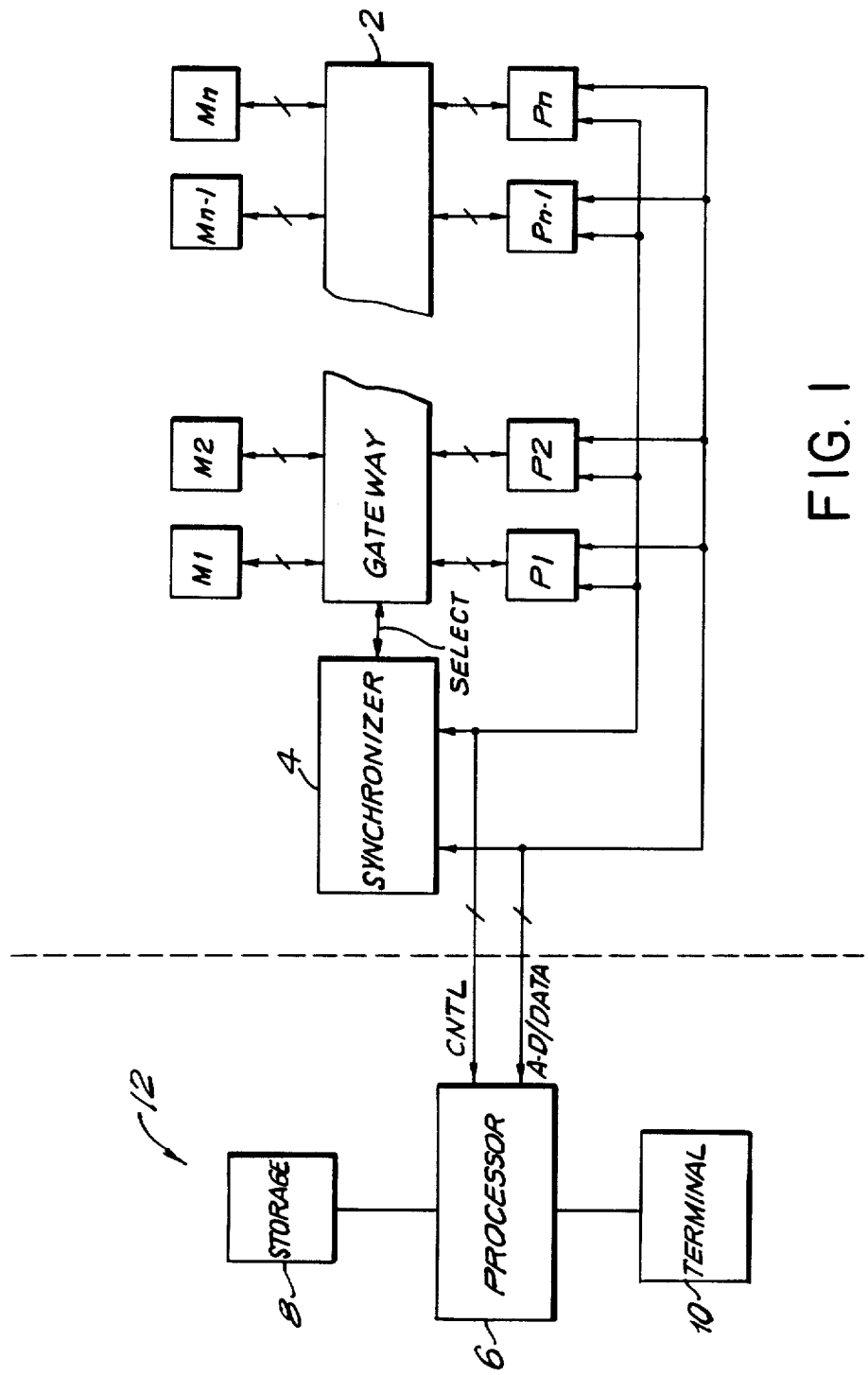
FIG. 1 is a block diagram illustrating a multiprocessor system according to the instant invention.

FIG. 1 is a block diagram of a multiprocessor computer in accordance with the instant invention. Illustrated in FIG. 1 are a plurality of slave processors P1–Pn coupled through a dynamic, bi-directional switching system (gateway) 2 to a plurality of memory modules or cells M1 through Mn. A synchronizer 4 is shown coupled through control communication lines CNTL and address/data.lines AD/DATA to the plurality of slave processors P1–Pn and to the master processor 6. Synchronizer 4 is further coupled through a selection communication line SELECT to the bi-directional gateway 2.

Further illustrated in FIG. 1 is a system controller section 12 including a master processor 6, a storage device 8 and an operator's terminal 10. A host computer, for example a PDP 11/23, may double as the master processor 6 or, if desired, may control the master processor 6.

Master processor 6 is shown in FIG. 1 coupled through control lines CNTL and address/data lines AD/DATA to the system synchronizer 4 and slave processors P1–Pn.

In simplest terms, the dynamic bi-directional switching system (gateway) 2 alternately links the individual ones of the slave processors P with topologically similar areas of memory M simultaneously and in a manner that no conflicts of memory access can occur. For example, assuming memory cells M through Mn are topologically similar, in one time frame the following linkages might be simultaneously provided: P1:M1, P2:M2, . . . Pn−1:Mn−1, Pn:Mn. In a subsequent time frame, assuming memory cells M2 through Mn and M1 are topologically similar, the following linkages might be simultaneously provided P1:M2, P2:M3, . . . Pn−1:Mn, Pn:M1.

Simultaneous non-conflicting memory access is provided in the instant invention through the operation of the dynamic bi-directional switching system (gateway) 2 operating under supervision of the synchronizer 4 and the master processor 6. The synchronizer 4 cooperates with the gateway 2 by providing selection signals SELECT to the gateway 2 which causes topologically well-defined connections to be made between the various processors P and the memory cells M in such a way that no memory conflicts occur.

Since the slave processors are non-conflictingly connected to one isolated memory cell at a time, they are able to operate at full speed in processing the variables within such a memory cell. Supervisory control is left to the master processor 6. As will be shown in greater detail below, the invention may be embodied in a computer system wherein it is possible to reconfigure the system from a truly parallel processing mode to a concurrent processing, e.g., pipelining, mode.

Particular gateway and synchronizer embodiments are discussed below by way of reference to the diagrams of FIGS. 3, 4A, 7A and 11A–11D.

The architecture of the multiprocessor computer, in a preferred embodiment, is such that a plurality of memory banks are effectively provided. Separate instruction and data buffer memory banks are preferably associated with each of the slave processors P1–Pn to store instructions and buffer data for the respective slave processors in a classic Harvard architecture. Another separate memory bank comprises the memory cells M1–Mn which are used to store system data/variables. Since programs and data are resident in different memory banks, the multiprocessor computer is architecturally non-von Neuman. In embodiments where the slave processors P1–Pn comprise microprocessors, execution time algorithms may be stored within the individual microprocessors.

To speed processing and increase accuracy, the slave processors may be bit-slicing processors. If multiple microprocessors are provided within a given slave processor, they also may be linked by bit-slicing. If microprocessors are chosen as the slave processors, it is preferable, although not mandatory, that they likewise embody a Harvard architecture to speed processing. Each slave processor will preferably have its own buffer memory and a relatively fast local instruction (register) memory of an adequate size to avoid degrading system performance. TMS320 and 8X300 microprocessors are examples of microprocessors comprising Harvard-type architectures.

In operation, each slave processor may be loaded with the same program, essentially the same program, or different programs depending on the problem to be solved and the degree of parallelism inherent in the problem.

Memory modules or cells M1–Mn are the working units of memory storage in the instant invention. In practice, each memory cell may contain one or a plurality of physical memory elements, such as memory chips, and associated communication mechanisms such as address decoders and bus drivers. As explained below, known software techniques may be provided under the control of the master processor 6 for partioning problem space and mapping problem space partitions among the plurality of memory cells. To insure non-conflicting access to the memory cells, and to avoid having slave processors being idle, a preferred embodiment will include at least as many memory cells as slave processors.

One function of the master processor 6 is to provide for the initial loading of data into the individual memory cells M1–Mn. As will be discussed in greater detail below, such initial memory mapping is preferably made in such a way that the dynamic variables of the problem are mapped into memory in relation to their values. The multiprocessor system of the invention may thereafter take advantage of the topology (and symmetries) of the pre-allocated memory space.

The initial data loading may be carried out across, e.g., 16/32 bit address/data lines AD/DATA via the slave processors P1–Pn through the gateway 2, into designated areas of memory, i.e., the memory cells M1–Mn. The initial loading of data (for example from storage unit 8) by processor 6 into the memory cells M1–Mn may be made through the cooperation of synchronizer 4 and gateway 2.

Since the operator of a preferred multiprocessor computer according to the instant invention can determine how input data will be mapped into the various memory cells M1-Mn, the operator may wish in advance of loading the memory cells M to manipulate the input data previously stored within master processor storage 8. This may be done by using the master processor 6 to configure the input data in an efficient manner so that when the data is read into the memory cells M1-Mn, dynamic variables may be effectively mapped or partitioned into memory in relation to their values. For example, a first set of related variables may be mapped into a first memory cell M1 while a separate set of related variables may be mapped into a second memory cell M2. Thereafter, when a first slave processor P1 is connected to memory cell M1, simultaneously with the connection between a second slave processor P2 and second memory cell M2, the two processors P1, P2 will be able to process related data within memory cells M1, M2 simultaneously and in parallel.

A system user who is further familiar with the algorithm to be run can determine the size and extent of memory requirements, and which variables will be stored in which memories, in advance of actual processing and gain thereby a reasonably uniform distribution of system variables. The computational problem itself may thus be partitioned in such a way that many processors can continuously process or update the dynamic variables residing in distinct areas of memory. The slave processors may likewise be loaded with the same or different computational algorithms.

Ordinarily, solving a given problem will require that the results of processing variables from one memory cell M will be used for further processing of variables within other of the memory cells. For example, a value from memory cell M1 may be required to complete processing of variables resident in memory cell M2. Gateway switching means are provided for allowing the slave processors to access a plurality of memory cells M in a non-conflicting manner.

Previously known systems rely on interprocessor communication to complete multiprocessing techniques. Although direct interprocessor communication could easily be provided here, the instant invention does not necessitate the use of directly communicating slave processors. Rather, to avoid the overhead commonly associated with direct interprocessor calls, the slave processors of preferred embodiments of the instant invention communicate only indirectly, through either the master processor 6 or by analyzing the data found in the memory cells previously articulated by other slave processors. Similarly, communication or flow of data between memory areas is only through the slave processors via the gateway or through the master processor.

Before describing in detail the functioning of the system gateway and synchronizer (which cooperate in providing non-conflicting, parallel connections between topologically similar memory cells and corresponding slave processors), the mapping of problem space into system memory (hardware) space will be discussed.

Figure 2A:
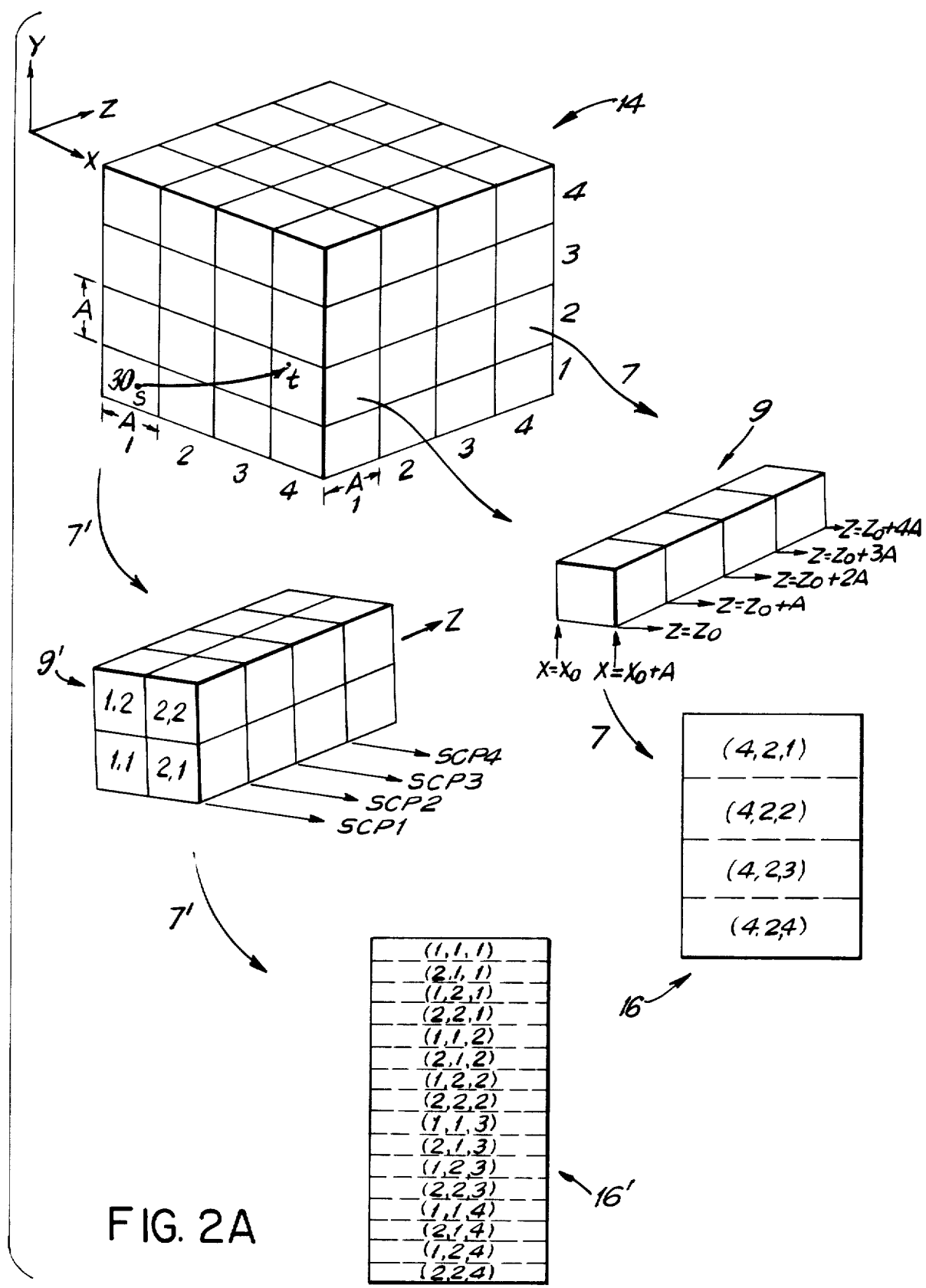
FIGS. 2A and 2B illustrate examples of partitioning problem space and using a memory map to map problem space into hardware space.
Figure 2B:
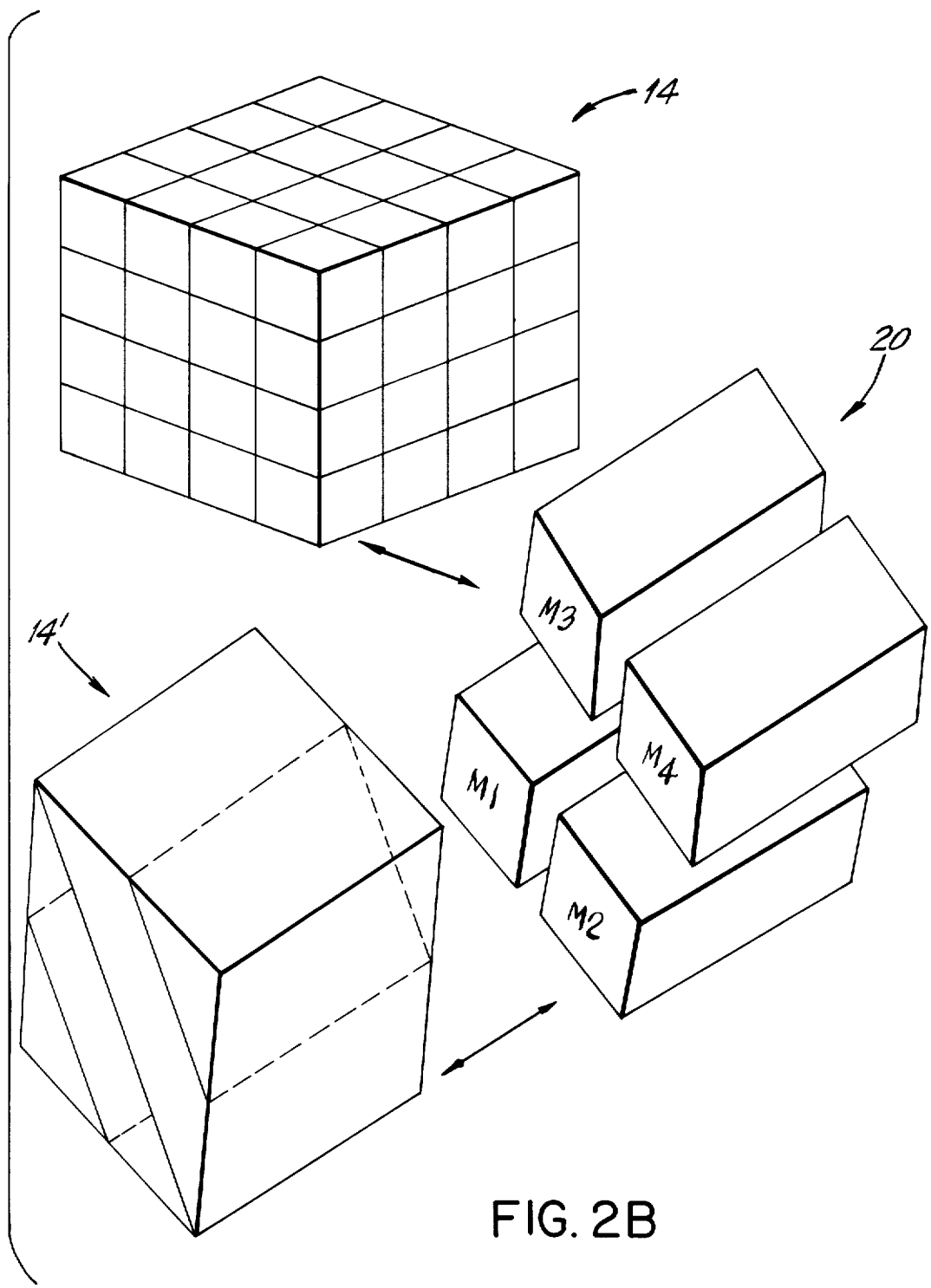

FIGS. 2A and 2B illustrate examples of how a multidimensional representation of a problem 14 (e.g., a problem in three-dimensional physical space) may be mapped into a two-dimensional memory cell map 16, 16' and ultimately into "hardware" space 20. It should be understood that there are many ways of mapping problem space into hardware space. It should also be understood that not all problems will require partitioning of problem space depending on the values of problem variables. Thus, the apparatus of the invention can accommodate a wide range of mapping schemes.

In the mapping schemes illustrated in FIG. 2A, the addresses of the problem variables (in hardware space) bear a relation to how the variables are found in their "natural" context (i.e., problem space).

In the example of FIG. 2A, physical space 14 is shown partitioned into 64 partitions, each of which, for the purpose of illustration, has a unique (X, Y, Z) coordinate as a reference. Each partition may be mapped into a corresponding "subcell" location. Memory map 7 is an example of a 1:1 mapping scheme wherein a single "column" (4, 2) of three-dimensional problem space is mapped into a single memory cell 16. Memory cell 16 will ordinarily be one of a plurality of memory cells in a computer according to the invention. Note that the "size" of the memory cell will be generally hardware dependent and may thus vary according to the implementation without departing from the invention. In the illustration of FIG. 2A, memory cell 16 is 64K in size.

To carry out the illustrated mapping scheme, an appropriate scale value A may be chosen which is representative of the dimension of the scaled, partioned, physical (problem) space. Scale value A may thereafter serve as the address displacement value for mapping locations (addresses) within the memory cell. Thus, as may be seen from an isolated physical (problem) space representation 9 of the column (4, 2) being mapped, address displacement value A can be used to determine the range of addresses in the X-Y plane (e.g., in the X dimension, addresses range from $X=X_0$ to $X=X_0+A$) and in the Z dimension (e.g., subcell 1 (partition (4,2,1)) ranges from address $Z=Z_0$ to address $Z=Z_0+A$; subcell 2 (partition (4,2,2)) ranges from $Z=Z_0+A$ to $Z=Z_0+2A$; subcell 3 (partition (4,2,3)) ranges from $Z=Z_0+2A$ to $Z=Z_0+3A$; and subcell 4 (partition (4,2,4)) ranges from $Z=Z_0+3A$ to $Z=Z_0+4A$). Column (4,2) may thus be mapped into e.g., 64K memory cell 16 as illustrated, each partition ((4, 2, 1), (4, 2, 2), (4, 2, 3), (4, 2, 4)) being mapped into its own 16K "subcell". The subcells will ordinarily, however, only be address distinctions as opposed to physical partitions.

As noted above, system memory mapping is under software control and may be undertaken in a variety of ways. For example, a second illustrated mapping 7' of FIG. 2A illustrates a 4:1 mapping scheme wherein four "columns" of problem space data ((1, 2), (2, 2), (1, 1), and (2, 1)) are mapped into a single memory cell 16'. In this mapping scheme, problem space partitions ((1, 1, 1), (2, 1, 1) . . . (2, 2, 4)) are mapped into 4K subcells of the 64K memory cell 16', according to their relative location or value in problem space. Note that with the illustrated 4:1 mapping scheme, it is possible to define subcell X-Y planes SCP1-SCP4 for each partition of the same Z dimension.

FIG. 2B illustrates that, with memory mapping schemes contemplated for use with the invention, physical analog or problem space 14 may be re-mapped into "hardware" space 20. In the example shown, physical space 14 is remapped into four 64K memory cells M1-M4.

Note, however, that any space filling subdivisions of problem space may be used for topological mapping. For example, physical space 14' may be mapped into four 64K memory cells C1-C4 using a "diagonal" subdivision scheme such as is illustrated in FIG. 2B. Since memory subdivision is contemplated to be under software control, a virtually endless number of possibilities exist for carrying out system memory mapping.

Thus, a user who is familiar both with the computational problem at hand and the system memory capabilities can map memory space (cells) to take advantage of the symmetries, or lack thereof, inherent in the data of the problem to be solved.

With a mapping scheme as such the ones illustrated in FIGS. 2A and 2B, variables from a problem in physical or analog space may be conveniently mapped into memory space in relation to their values. More particularly, physical/analog problem varibles can be mapped into hardware space address locations depending, for example, on the location of the variable in its problem environment. The instant invention thus allows the dynamic variables to be explicitly represented by data values stored in memory as well as implicitly represented by their location (or address) in memory.

With a system according to the instant invention, three-dimensional cellular representations of data may be processed by a square array of processors which work through the third (Z) dimension at each simulated time step. Hence, cells in the "Z" direction (FIG. 2A) are handled in the extent (depth) of each data memory cell. Higher dimensionality (i.e., greater than three) may also be handled by appropriate mapping.

Thus, instead of building a three dimensional representation of physical space in memory, which could be done by increasing the complexity of the system, the instant invention allows processing in a third dimension by using parallel processing in the XY plane and sequential processing in the Z plane. Switching to the Z phase is easily accomplished and may be implemented with a software switch (see FIG. 9B).

The projection of a three-dimensional problem onto a two-dimensional space which in turn is mapped into memory/processor space represents an efficient power versus cost solution for handling complex mathematical problems since the number of processors need not scale linearly with the complexity of the system. In fact the number of processors will typically scale as (complexity) to the ⅔ power since a three-dimensional problem has been projected onto a two-dimensional space. For example, in a problem from the field of molecular dynamics, for cubic system sizes and at constant particles per three-dimensional partition, the number of processors required will scale as the two-thirds power of the number of particles in the system. Thus, in three-dimensional problems, although the amount of time required to complete a calculation may increase with the complexity of the problem (in the example just given, the time for a number of iterations will increase as the one-third power of the number of particles) the number of processors required (and therefore the hardware cost) does not become prohibitively large (as might be expected, for example, in a three-dimensional problem to three-dimensional memory space mapping).

As discussed previously, with a multiprocessor computer according to the instant invention, memory variables may be partitioned and mapped into system memory space to take advantage of the symmetries which occur in many mathematical problems However, not all problems will be solved by processing variables within a given one of n memory cells without the interaction of data or results from neighboring memory cells. In fact, most complex problems contain a degree of overlapping data. Thus, the instant invention provides a novel dynamic bi-directional switching system or gateway which allows alternating, synchronous and non-conflicting access between the system slave processors and topologically similar memory cells.

Particularly, in the instant invention each slave processor is switchably associated with a plurality of memory cells. Likewise, each memory cell is switchably associated with a plurality of slave processors. The system gateway 2 (FIG. 1) and synchronizer 4, under the control of the master processor 6, synchronously connect the slave processors to topologically similar ones of their associated memory cells, one cell at a time, ordinarily in some alternating manner, such that all of the memory cells associated with a given slave processor may be accessed by the slave processor, one after the other.

System scheduling is complicated, however, by the fact that memory access conflicts must be avoided, i.e., a given memory cell should not be accessed simultaneously by more than one slave processor. Furthermore, for reasons of optimization, only one slave processor should have access at any given time frame to a particular memory cell.

Figure 3:
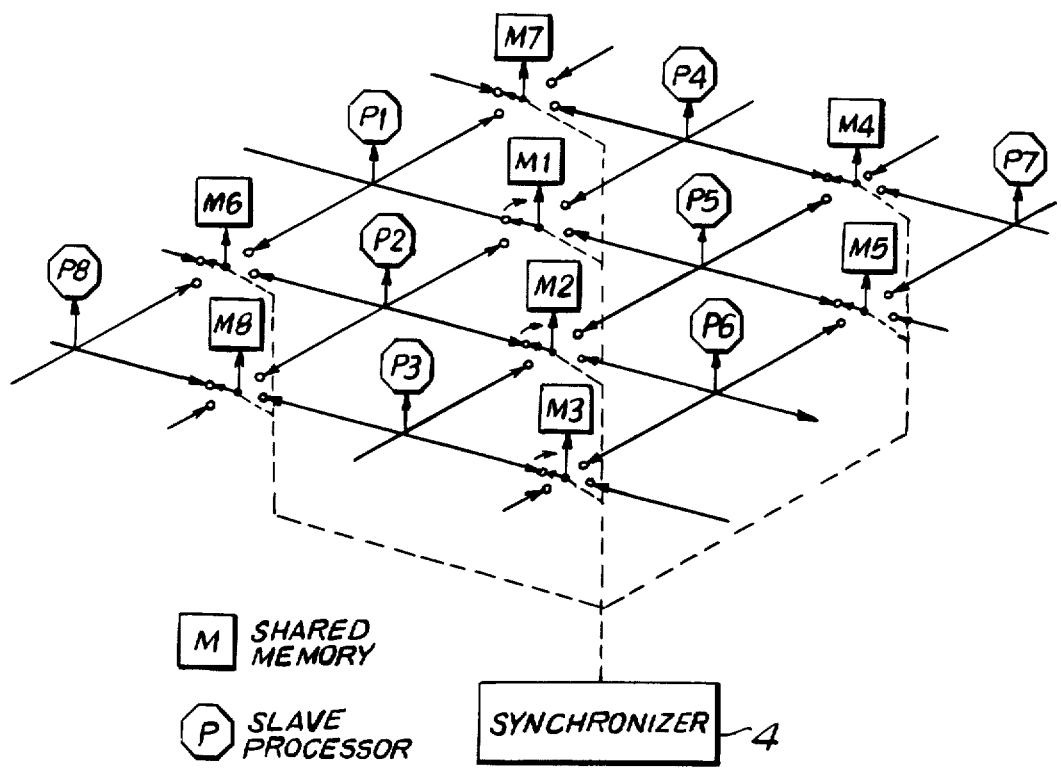
FIG. 3 is a schematic representation of sequential memory access in a multiprocessor system according to the instant invention.

The instant invention provides novel memory articulation techniques which solve these problems. FIG. 3 illustrates a network of slave processors P1-P8 shown schematically intermixed with a plurality of memory cells M1-M8. Each memory cell M is shown switchably associated with a plurality (four) of slave processors P while each slave processor P is shown switchably associated with a plurality (four) of memory cells M. The solid line pathways of the schematic of FIG. 3 belong to the system gateway 2 (FIG. 1). The system synchronizer 4 (shown schematically as dotted lines in FIG. 3) acts in cooperation with the gateway to synchronously and non-conflictingly connect the various slave processors P1-Pn to topologically similar ones of their associated memory cells M1-Mn.

In the embodiment of FIG. 3, for example, slave processor P2 is shown switchably associated with four memory cells M1, M2, M8 and M6. As stated previously, these memory cells may be loaded with variables whose values depend to some extent on the values of other variables within the cell or on the values of variables found within neighboring memory cells. Thus, a given slave processor, such as P2, may have access to closely related variables stored within an individual memory cell, such as M6, and also to further related variables in neighboring memory cells M8, M2 and M1.

Similarly, slave processor P5 is shown switchably associated with memory cells M4, M5, M2 and M1. These memory cells may likewise contain variables whose values depend on the contents of variables within their neighboring cells. Thus, as with processor P2, processor P5 would likewise have efficient access to related variables of the cells with which it is associated.

The instant invention provides a technique not only for avoiding conflicts in memory access but also for simultaneously enhancing program efficiency by providing synchronous access between topologically similar memory cells thru corresponding slave processors. The system synchronizer 4 further allows for synchronous shifting between different topologically similar memory cells, in phases, in cooperation with the master processor 6 and gateway 2 (FIG. 1).

For example, in the schematic of FIG. 3, the synchronizer 4 is shown synchronously effecting, or causing to be effected, connections between a plurality of topologically similar memory cells and corresponding processors, i.e., memory cell M1 is being connected to slave processor P1, M2 to P2, M3 to P3, M4 to P4, M5 to P5 and M8 to P8. As will be explained in more detail below, for processing periodic boundary problems (such as toroidal boundaries), processor P7 may be likewise connected to memory cell M7 and processor P6 may be connected to memory cell M6, etc., as needed, depending upon the specific boundary conditions present.

In the phase of the configuration illustrated in FIG. 3, each slave processor P has uninterrupted access to a corresponding memory cell M to which it is connected. In a subsequent time frame the slave processors P may be simultaneously switched to a memory cell neighboring the prior articulated memory cell by operation of the system synchronizer 4. For example, in a time frame subsequent to that shown in FIG. 3, the synchronizer 4 may effect a connection between processor P2 and memory cell M1 while synchronously making connections between the other topologically similar memory cells and their corresponding processors, e.g., P1:M7, P3:M2, P5:M4, P6:M5 and P8:M6.

Further, in each time frame, a given slave processor will have uninterrupted access to the connected memory cells and will thus theoretically achieve full speed. Further still, note that all slave processors will simultaneously, and in parallel, access topologically similar memory cells thereby achieving true and efficient parallel processing.

Note that the system avoids the need for software written to specifically prevent processor-processor and memory-memory conflicts.

It will, of course, be understood that gateway pathways such as are illustrated in the schematic of FIG. 3 will preferably be bi-directional, i.e., allowing reading from and writing to the various memory cells.

Figure 10:
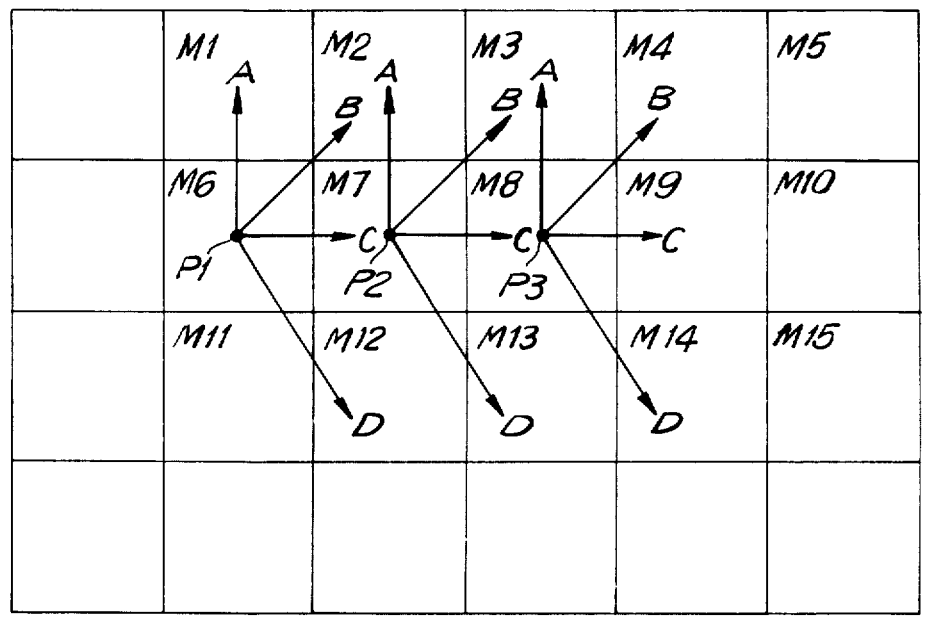
FIG. 10 illustrates the sequencing of synchronous parallel access to topologically similar memory cells achievable with the instant invention.

FIG. 10 illustrates a sequence of concurrent processing of topologically similiar memory cells in accordance with the invention. FIG. 10 shows a grid including quadrants representing memory cells M1 through M15. Also illustrated in the grid of FIG. 10 are points P1, P2 and P3 representing slave processors P1-P3. For purposes of simplicity, a simple phase analysis will be provided illustrating that topologically similar ones of the memory cells Mn are simultaneously connected to corresponding slave processors Pn. In a first phase, represented by arrows A, slave processors P1, P2 and P3 are concurrently and simultaneously connected to topologically similar memory cells M1, M2 and M3, respectively. During a second time phase illustrated by arrows B, connections are made between slave processors P1, P2 and P3 and their topologically similar memory cells M2, M3 and M4, respectively. Similarly, in a third phase, connections may be made between processors P1, P2 and P3 and topologically similar memory cells M7, M8 and M9 (arrows C), respectively. Finally, during the phase indicated by the arrows D, connections are made between the slave processors P1, P2 and P3 and the topologically similar memory cells M12, M13 and M14, respectively. Of course, a variety of associations between slave processors P and memory cells M may easily be contemplated and implemented in accordance with preferred embodiments of the instant invention so long as during a given phase, topologically similar memory cells are connected to corresponding slave processors. Such connections will allow the slave processors P to operate on the connected memory cells M at full speed and in parallel with the processing by the other slave processors of topologically similar memory space.

Analyzing system performance in terms of "phases" it may be seen that in a first phase a processor which is executing a given algorithm will pick up all values in a first topological orientation. In a second phase, the slave processor will pick up all values in a second topological orientation. In a third phase, the slave processor will pick up all values in a third topological orientation, etc.

Note, however, that not all applications of the invention will require switching of processors between different memory elements. For example, in solving problems wherein data does not overlap between different memory elements, or wherein the slaves execute different programs from one another, it may not be necessary to switch to different memory elements. Several examples of these situations will be discussed further below. Likewise, it is contemplated that pipelined and other concurrent processing techniques may be practiced with a system of the invention upon reconfiguration.

In terms of the diagram of FIG. 3, an individual slave processor, e.g., P2 will have full access in one time frame to the contents of memory cell M2. In a subsequent time frame, slave processor P2 may have access memory cell M8 which is a "neighbor" of memory cell M2. In yet another subsequent time frame slave processor P2 may access a further neighboring memory cell M6. In a following time frame, slave processor P2 may access memory cell M1. Note that processor P2 may, if desired, use knowledge acquired from its processing of memory cell M2 to carry out its processing of memory cell M8, etc., in a "round robin" or sequential fashion.

In a preferred embodiment, the synchronizer 4 for the gateway 2 is completely software programmable by the master processor. Thus, the switches in the gateway at each node (memory/processor element) that the synchronizer enables, how many times they are enabled and when they are enabled may be completely determined by the master. Further, the synchronizer (at a command from the master) may be run independently of the master processor. The slaves may likewise be asynchronously or synchronously controlled in each phase.

The sequencing of memory access furthermore need not be in the "round robin" fashion described. Thus, in terms of FIG. 10, the "hands" of each "clock" do not have to always move in a clockwise, counter-clockwise or otherwise sequential fashion. However, the hands of each clock do preferably move in phase with the others. For example, the sequence of the processing illustrated in FIG. 10 may be, in terms of the arrows shown, ACBD, ABCD, DABC, BCAD, etc.

As stated previously, the system is intended to avoid inter-slave processor communications and the attendant overhead costs. Instead, the master processor 6 of FIG. 1 provides an indirect method by which the slave processors can communicate with one another, e.g., by leaving messages with the master processor 6, or by affecting the state of a variable maintained by the master processor element 6. The slave processors can further communicate with one another indirectly by updating variables in the memory cells over which they have overlapping, non-simultaneous access. For example, in a first time frame slave processor P1 (FIG. 3) may have access to memory cell M1. In a second time frame, slave processor P4 may have access to the same memory cell M1. Such indirect forms of communicating, though seemingly more complex than direct communication, avoid the overhead associated with establishing direct communication links between otherwise independent processors.

Similarly, communication or flow of data between memory cells is only through the slave processors via the gateway or through the master processor.

FIG. 3 illustrates a processor-memory system in four-fold coordination, i.e., each slave processor P is switchably associated with four memory cells M while each memory cell M is switchably associated with four slave processors P. Another preferred topologcal configuration of memory and slave processors utilizes five-fold coordination such as is illustrated in FIG. 4. As will be explained in greater detail below, five-fold coordination is the minimum architectural arrangement which will satisfy "octagonal" topographies.

Certain problems are solved more efficiently using four-fold coordination; certain other problems are solved more efficiently using five-fold coordination. Higher and lower coordinations are, of course, achievable and may be provided within the scope of the invention to improve system performance as desired.

Figure 4A:
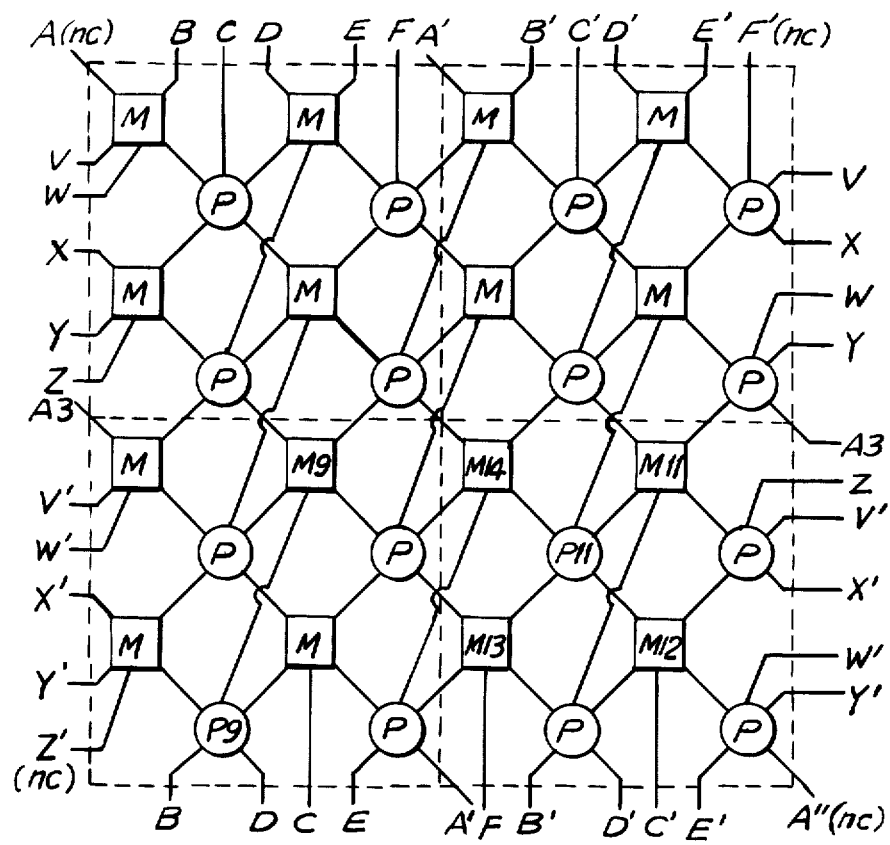
FIG. 4A is a schematic representation of a topological configuration of memory cells and processors in five-fold coordination according to the instant invention.

The embodiment of FIG. 4A illustrates 16 slave processors P and 16 memory cells M. As with the embodiment of FIG. 3, all pathways are bi-directional and belong to the system gateway. A fifth articulation is added to the embodiment of FIG. 4A which was not illustrated in the embodiment of FIG. 3. The fifth articulations are illustrated in FIG. 4A as bridged pathways between each slave processor P and a fifth memory cell M outside of the square memory arrangement which was illustrated in the embodiment of FIG. 3. For example, a "fifth" articulation is shown between slave processor P9 and memory cell M9.

For problems involving periodic boundary conditions, all paths of the same alphabetic designation in FIG. 4A may be jumpered together, for example, in a toroidal fashion (a hyperplane) such that all slave processors would access five memory cells and each memory cell would be accessible to five slave processors. Similar periodic systems could be likewise configured. Other boundary conditions may also be simulated.

The system of FIG. 4A operates in the same fashion as the system of FIG. 3 with the exception that a fifth articulation is added into the sequence in the embodiment of FIG. 4A. For example, a given slave processor P11 may articulate, in sequence, each of memory cells M11, M12, M13, M14 and M15. Simultaneously, the other 15 slave processors of the embodiment of FIG. 4A would articulate topologically similar memory cells such that not only will no data conflicts occur, but improved performance characteristics will result from the synchronous processing of topologically similar memory cells presumably containing highly related variables.

Thus the invention contemplates that each memory element (in the two-dimensional map) be preferably joined via the gateway to four or to five slave-processors (and each slave to four or five memory elements) depending on the symmetry and topology of the problem being solved. Higher coordinations are, of course, possible.

Figure 5A:
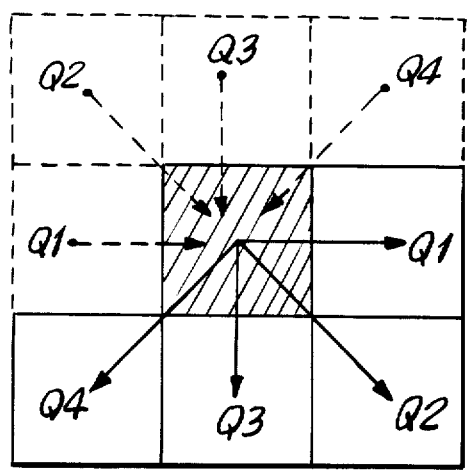
FIGS. 5A and 5B are schematic representations of the topological relationship between a memory map in the X-Y plane and system gateway coordination in order to achieve access to each adjacent cell in relation to a reference cell (indicated by cross-hatching)
Figure 5B:
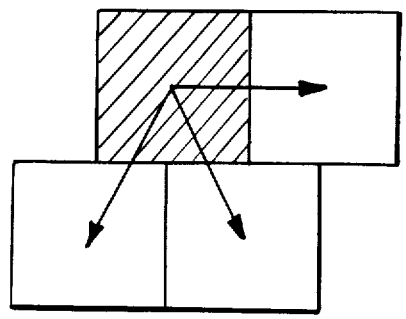

FIGS. 5A and 5B illustrate the topological relationship between memory maps in the XY plane and gateway coordination in order to achieve access to each adjacent memory cell in relation to a reference cell (indicated by cross hatching). FIG. 5A illustrates that "octagonal" topology reduces to five-fold coordination by symmetry. Similarly, FIG. 5B illustrates that "hexagonal" topology reduces to four-fold coordination by symmetry. The reduction of octagonal to five-fold and hexagonal to four-fold coordination occurs because for most problems an i-j coordination (or "articulation") is trivially related to the j-i coordination. The bi-directional gateway effects this reduction since the reference cell will be ordinarily linked by some processing phase (see FIG. 5A).

In terms of FIG. 5A, assume that the reference cell (illustrated by cross-hatching) will be processed by an associated slave processor during a given phase (i.e., any of the phases Q1–Q4 shown). To complete the processing of the eight cells topologically surrounding the reference cell, only four additional iterations need by processed, i.e. those referenced by the solid line arrows (phases Q1–Q4 shown) of FIG. 5A, for a total of five iterations. Hence, the expression five-fold coordination. The remaining four cells surrounding the reference cell, i.e. those indicated by dotted lines, are presumably being processed during the same time frames by one or several different slave processors. The reduction of "octagonal" (i.e., there are eight cells surrounding the reference cell) to five-fold coordination thus occurs because the i-j articulation (processed during the iterations discussed) is trivially related to the j-i articulation.

Similarly, the "hexagonal" topology represented by FIG. 5B (the cross-hatched reference cell may be surrounded by six cells) reduces to four-fold coordination due to symmetry, i.e. the i-j articulation is again trivially related to the j-i articulation.

Figure 4B:
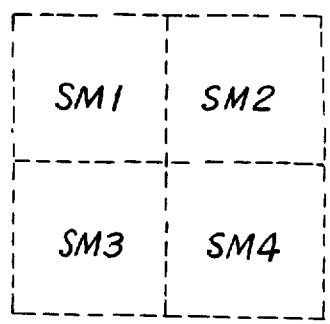
FIG. 4B illustrates the modularity of architechture achievable in a system according to the invention.

Another extraordinary beneficial result realizable in preferred embodiments of the instant invention is a high degree of modularity. The modularity may be illustrated by the embodiment of FIG. 4A. In FIG. 4A, the dotted lines illustrate that the 16 processor/16 memory cell system may comprise four identical four-processor sub-modules SM1, SM2, SM3, and SM4 (FIG. 4B). It will be readily appreciated that the modularity of the system may be easily exploited by adding additional sub-modules ("cabling" the edges together) to increase the number of parallel elements and thus expand the power of the invention. Replication of each module may be carried on virtually without end. The processing power of the system may thus be made to grow in relation to the size and/or complexity of the problem at hand without major software changes. Note that the sub-modules need not necessarily contain four slave processors and four memory elements as shown and that other modular designs may be provided.

Note that in preferred embodiments of the invention, where the memory cells include physical memory elements such as memory chips, system memory capability may be further easily expanded by upgrading, for example from 16K to 64K and beyond RAM chips, or by replacing faster for slower memory elements, to thereby accomodate greater numbers of variables as system memory requirements increase.

Figure 6A:
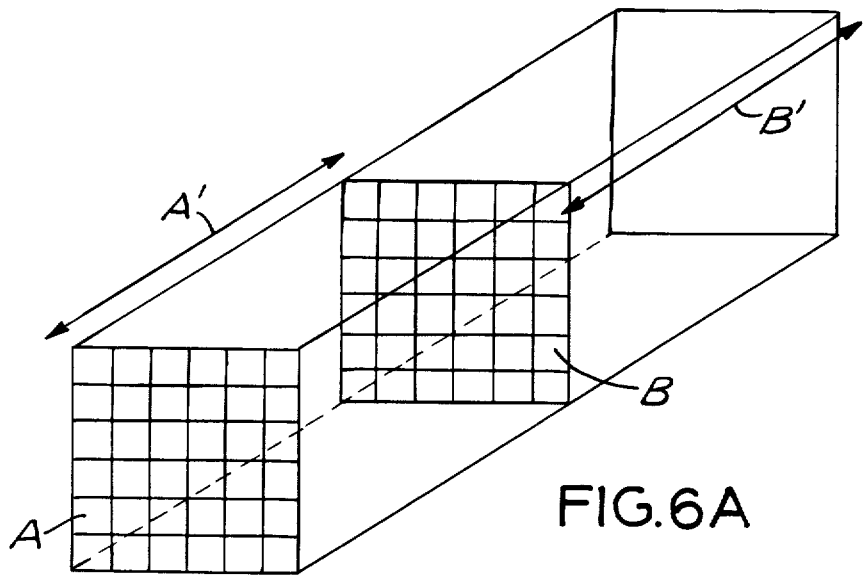
FIGS. 6A and 6B illustrate a method of expanding system size by linking two independent memory/processor arrays via a master processor.
Figure 6B:
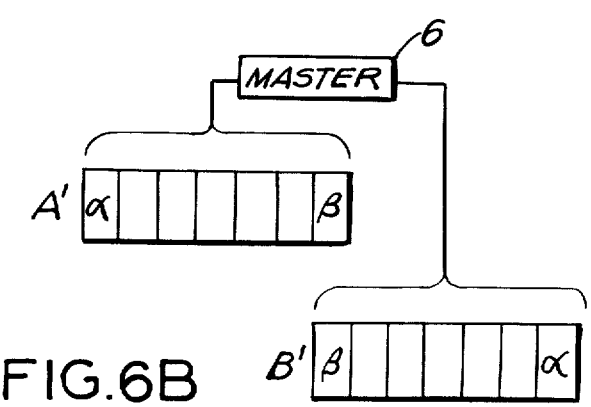

As shown in FIGS. 4A and 4B, the size and power of the instant multiprocessor system may be expanded by exploiting the modularity built into preferred embodiments. An alternate way of expanding system size is illustrated in the diagrams of FIGS. 6A and 6B. FIGS. 6A and 6B illustrate a method of expanding system size by linking two memory/processor arrays or racks via the master processor 6. Data at the "edge" of memory is communicated through the master processor 6. This procedure adds very little overhead compared with the increased memory size and computing power obtainable.

More specifically, FIG. 6A illustrates two memory/processor planes A and B and their respective memory depths A' and B'. FIG. 6B illustrates the linkage of the two independent memory/processor arrays or racks via the master processor 6. A', the memory depth of the first independent array, comprises cells alpha and beta at its "edges". Similarly, the second array memory depth B' comprises cells beta and alpha at its edges. Master processor 6 links the two independent memory/processor arrays and provides for communication of data at the "edges" of the memory arrays, e.g., beta to beta and alpha to alpha. A physical implementation of this expansion concept is discussed below by way of reference to the drawing of FIG. 11A.

Figure 7A:
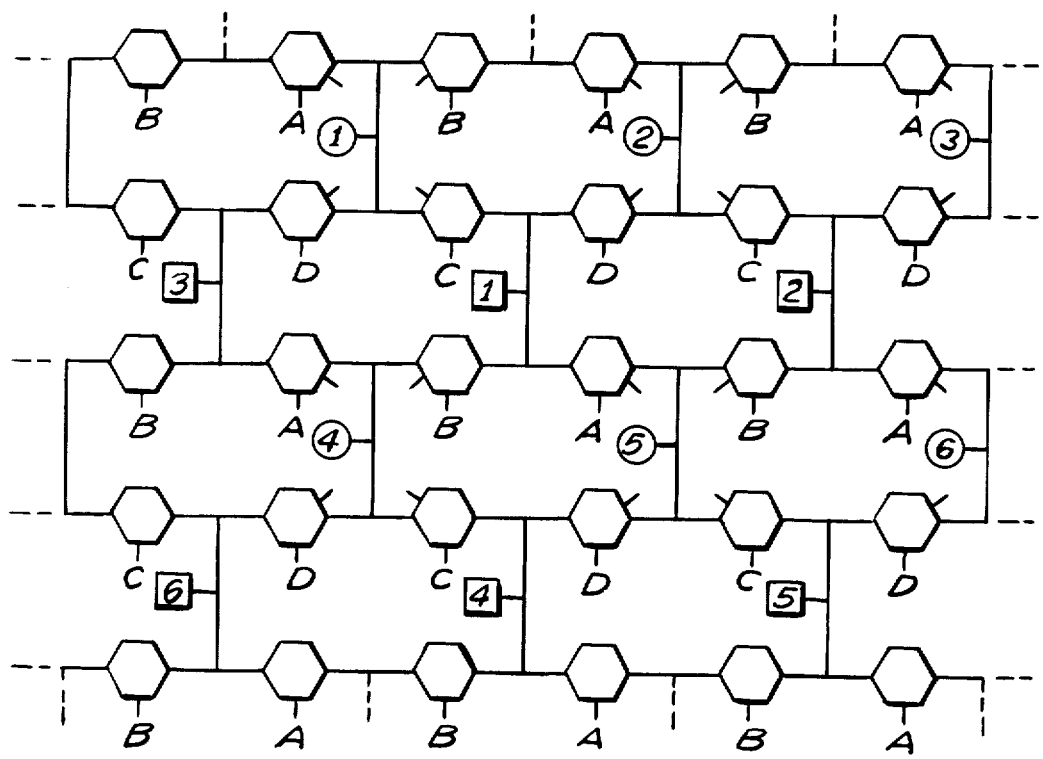
FIG. 7A is a schematic representation of a gateway design employing pathway elements, illustrating four-fold coordination.

A gateway design employing pathway elements is illustrated in the schematical drawing of FIG. 7A. Four-fold coordination is illustrated for simplicity, however, higher coordination may be achieved by adding elements and interconnections. In the illustration of FIG. 7A, slave processors are denoted by circular elements, memory cells by square elements and bi-directional controlled pathway members by hexagonal elements. The synchronizer 4 (FIG. 7B) allows only one select line (A, B, C, or D) to be active at any time—thus avoiding access conflicts. Additional access channels and handshake logic, will, of course, be required in an actual implementation.

Figure 7B:
FIG. 7B is a symbolic representation of a system synchronizer showing representative inputs and outputs.

In operation, the system gateway, a simplied version of which is illustrated in FIG. 7A, is responsive to the system synchronizer 4 illustrated in FIG. 7B and switchably connects topologically similar memory cells (shown in square boxes) to corresponding slave processors (shown as circles) in accordance with a select signal (A, B, C or D) received from the system synchronizer 4. Synchronizer 4 is itself responsive to signals from the master processor MASTER and clock signals CLOCK as is illustrated in FIG. 7B. Thus, in response to a signal from the master processor MASTER or a clock signal CLOCK, synchronizer 4 will emit a select signal (A, B, C or D) for connecting topologically similar memory cells to corresponding slave processors.

In terms of FIGS. 7A and 7B, if synchronizer 4 emitted a signal corresponding to "C" (or the select line corresponding to "C" was high while select lines A, B and D were low) then connections would be made across all "C" bi-directional controlled pathways within the gateway thereby establishing connections between certain of the topologically similar memory cells and corresponding slave processors. Thus, in the example just described, with a select signal corresponding to "C" having been emitted from the synchronizer 4, a connection would be established between slave processor 1 and memory cell 1, slave processor 2 and memory cell 2 . . . slave processor 6 and memory cell 6, all of which are presumably in topologically similar orientations. Note that this design prevents memory access conflicts.

Figure 8A:
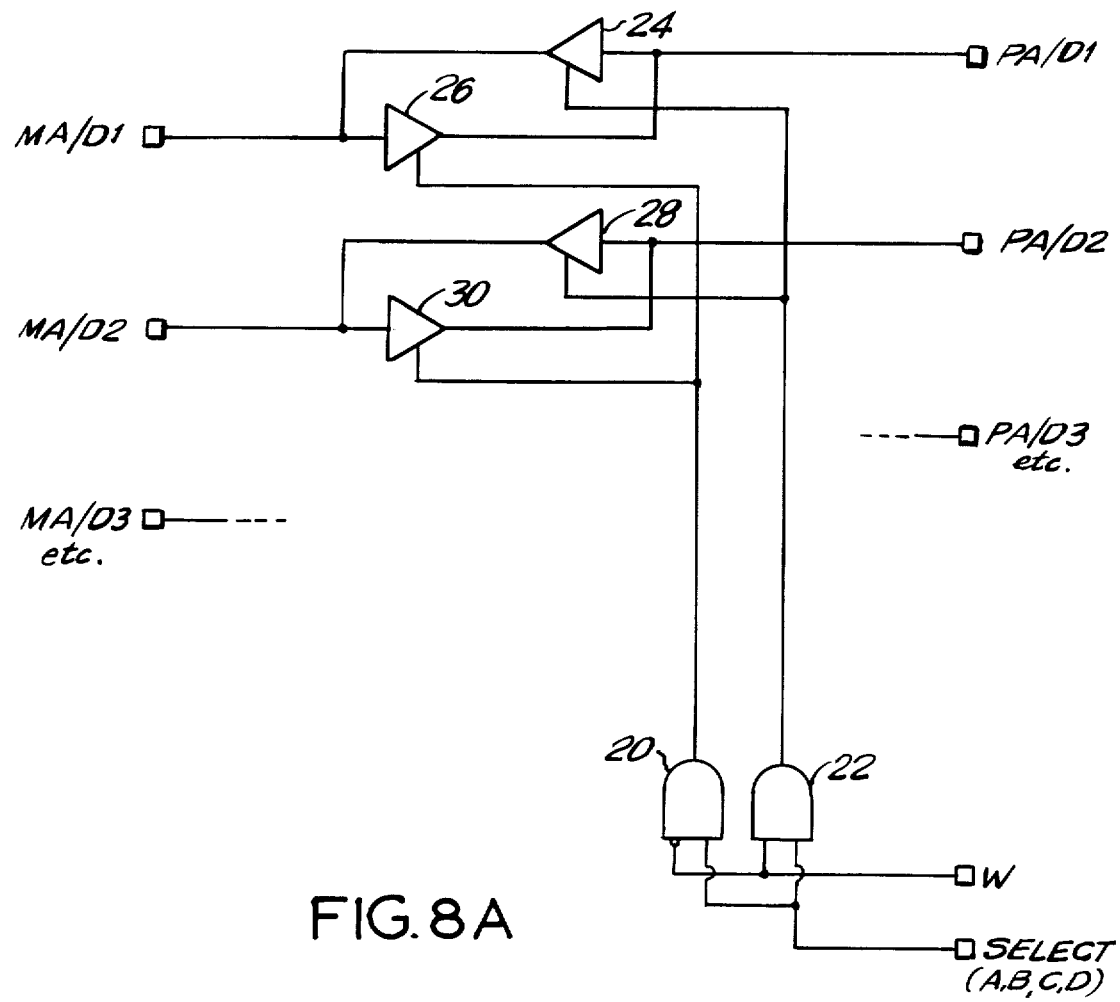
FIG. 8A is an illustration of a logical implementation of the bi-directional pathway elements of FIGS. 7A and 8B.
Figure 8B:
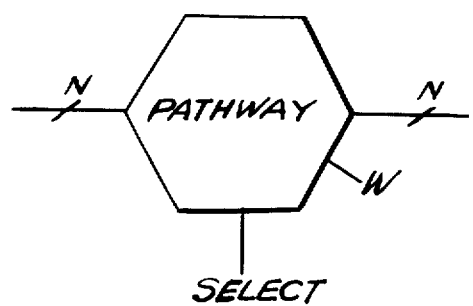
FIG. 8B is a symbolic representation of a bi-directional pathway element.

FIGS. 8A and 8B illustrate a possible logical implementation of the bi-directional controlled pathways illustrated by the hexagonal elements in FIGS. 7A and 7B. Such an implementation may be used to couple memory address/data lines MA/D1 through MA/Dn to slave processor address/data lines PA/D1 to PA/Dn. Note that the bi-directional controlled pathway illustrated by the hexagonal symbol on FIG. 8B includes a signal input W for controlling the direction of data flow.

In general, the number N of address/data lines required in each pathway is roughly equal to the number of processors times the bus width. Phase information lines need also be provided. Thus, if the number of processors chosen is 16, and the word width is 32, then $32 \times 16 = 512$ address/data lines need be provided in addition to the, e.g., 16 lines required for phase control.

As will be readily seen from the logical diagram of FIG. 8A, a given pathway is only active when the select line SELECT is high; otherwise, drivers such as 24, 26, 28, and 30, may be tri-stated so that other pathways can be active. For example, assume that the select line SELECT (A, B, C, D) is high and the directional signal W is high. In that case, AND gate 22 will produce a high signal to driver 24 allowing passage of data along the communication line between processor address/data line 1 PA/D1 and memory address/data line 1 MA/D1. Since the directional signal W is high, AND gate 20 will produce a low signal which will cause driver 26 to be shut thus preventing conflicting data flow in the reverse direction. A partial embodiment of the bi-directional controlled pathway of FIGS. 8A and 8B may be provided using a Texas Instruments, Inc. SN54AS245 type octal bus transceiver with 3-state outputs.

Figures 9A, 9B:
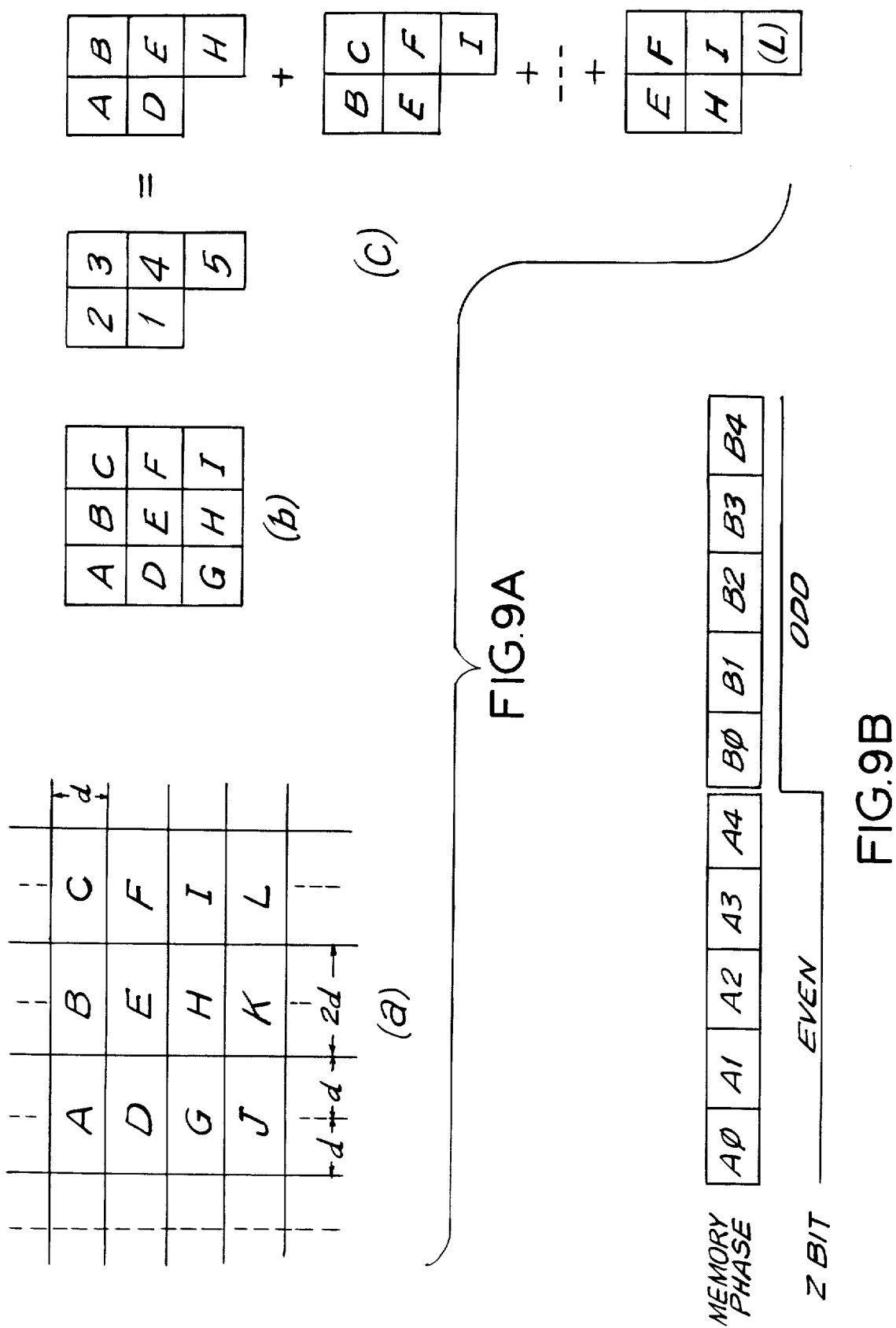
FIGS. 9A and 9B illustrate the synchronous sequencing of memory access in order to avoid conflicts.

FIG. 9A illustrates the synchronous sequencing of memory access in order to avoid conflicts in a multiprocessor computer in accordance with the instant invention. Five-fold coordination (see FIG. 5A) is again illustrated. In FIG. A, (a) illustrates a partial physical model of a problem; (b) represents a partial hardware map of the model (a); and (c) illustrates an example of a possible processing sequence.

In the implementation illustrated in FIG. 9A, two adjacent physical partitions or cells are mapped into the same memory element, forming a basic map of two cells per element. As illustrated in model (a), displacement value d is chosen to equal the length of the partition edge in physical space. The memory map (b) as illustrated maps two physical partitions for each "Z plane" into each memory element cell.

After mapping, processing is carried out simultaneously on each cell of the same symmetry under control of the synchronizer. A sequence of five phases (1, 2, 3, 4, 5) is sufficient to process data in all possible adjacent memory elements. (See discussion regarding FIG. 5A).

FIG. 9A thus illustrates the ability of the instant invention to achieve full speed performance by each processor. During each phase 1, 2, 3, 4, 5 the slaves work at full speed on different memory elements while avoiding conflicts. For example, a first processor may access memory elements D, A, B, E, H in sequence while concurrently a second processor accesses elements E, B, C, F, I in sequence. The plus sign "+" in FIG. 9A implies concurrency.

Thus, with the instant invention, the synchronization of memory access allows the processing of data in adjacent memory elements in an overlapping way such that all required processing is carried out while reducing the overall computation load (and topological coordination) by a factor of two or more relative a full or naive coordination.

In certain problems, a second cycle, illustrated in FIG. 9B, may be required to process adjacent cells in the "Z" dimension which are mapped into the same memory element at alternate addresses (see discussion regarding FIG. 2). FIG. 9B illustrates five-fold coordination in a first memory phase A1, A2, A3, A4, A5 while the "Z" bit is even (for "XY" processing) and in a second phase B1, B2, B3, B4, B5 while the "Z" bit is odd (for "Z" processing). This two to one design may be called the "system master cycle."

In one embodiment of the invention, slave processor elements have been selected (TMS-320) which have internal multiply and add capabilities exceeding all other microprocessors currently available. A well-known Harvard architecture is employed in this embodiment which retains program and table memory with the individual slave processors. 16 bit data buses articulate the processors and memory cells. The gateway is synchronized by a master controller, a DEC PDP 11/23, which in this embodiment is also the host computer.

Given computational algorithms are contemplated to be under software control, resident within the slave processor memory bank and may be dynamically changed by the master processor.

A particular application of the instant invention will now be described to provide a better understanding of the power which the instant multiprocessor computer invention brings to bear.

One class of computing problems which are more readily solved using an apparatus according to the instant invention are certain problems in the field of materials science. The understanding of material properties using continuous coordinate simulations (e.g. molecular dynamics or Monte Carlo simulations) is a powerful and fruitful field of research. Given the interaction potential between particles (atoms, molecules, crystallites) in the system, the simulations produce "exact" results. Since, in general, these are classical mechanical simulations, the trajectories of all the particles in the system may be stored, analyzed and displayed in topologically well-defined ways. Thus, in the study of equilibrium or non-equilibrium properties related to the positions or velocities of particles (e.g. growth rates, defect properties, phase separation, diffusion coefficients) and in the investigation of the requirements of materials design, the invention disclosed herein will provide tremendous power.

Simulators in the field of materials science have traditionally worked on model systems like hard-spheres, Lennard-Jonesium etc., in which there is no real attempt to reproduce the properties of specific systems. There is pragmatic merit in doing this; many of the fundamental mechanisms of materials behavior manifest themselves in simple model systems and understanding this is a necessary first step in the evolution of materials characterization by simulation. However, the properties of whole classes of materials, such as those with directional bonds (e.g. Si, GaAs), remain virtually unexplored. Simulation methods may be extended to these properties. However, because of heretofore inadequate computer power, conventional machines, no matter how dedicated to a problem, simply cannot cope with covalent and long-relaxation-time systems.

In the materials art, most model systems presently under study are concerned with pairwise forces. In such simulations, the time to perform a computer experiment using modern algorithms and "bookkeeping" methods increases as nN where n is the number of particles within the force-field of a given atom and N is the number of particles in the system. With typical VAX 780 shared-resource power, projects involving more than 1000 particles in a system and elapsed simulation times of more than $10^{-9}$ seconds are rarely attempted. Each such run would require 10 hours of CPU time. A typical project, involving properties in which relaxation times are short and in which system size plays little part, requires typically 50 runs, giving a total of 500 VAX hours. See, "Monte Carlo Methods in Statistical Physics", ed. K. Binder, Topics in Current Physics (Springer) 7, (1979); J. R. Beeler, "Advances in Materials Research", ed. H. Herman (Wiley, New York, 1970), Vol. 5, Page 295; R. W. Hockrey and J. W. Eastwood, "Computer Simulations Using Particles" (McGraw-Hill, New York, (1981)).

If three-body forces are modelled, computer time will increase as $n^2N$. For most computational processes, n is approximately equal to sixty, hence the computer power required to handle three-body systems must increase by at least a factor of 60 over that required for pairwise systems. (A project similar to this 500 hour pairwise model now requires 3.4 totally dedicated VAX years). Yet, three-body systems are extremely technologically important to transition metal and semiconductor systems. At present, such systems are either only handled within the harmonic approximation (lattice dynamics) or run for very short elapsed times corresponding to short trajectories in configuation space. Thus the entire class of technologically relevant semiconductor compounds are virtually excluded from simulational investigation because of the severe computational demands. Further, because of heretofore insufficient computer power, the quality of these potentials has not evolved to a high degree of accuracy. Three-body potentials for transition metals, for example, are often parametrized against crystalline experimental data, and will therefore model liquid transition metals poorly.

Thus, present computer simulation algorithms are quite capable of handling system size dependencies and more complex potentials if only more machine power could be brought into use. For example, after much exhaustive work on a CRAY computer, researchers are known to be near perfecting a three-body potential for silicon that describes its dynamic and thermodynamic properties accurately in both the liquid (metallic) and crystal phases. This potential can thus be used to study almost any equilibrium or non-equilibrium structural property of silicon if an adequate computational facility was available. Such a facility has now been made available with the instant invention. With the instant invention, it is possible to match the machine's architecture to the calculation's inherent structure.

The topologically related memory-processor interconnections of the instant invention are very efficient at handling large class of problems which may be partitioned in a way that their dynamic variables depend on what happens at near (although not necessarily the nearest) neighbor partitions. The disclosed architecture applies equally well to both wave-like and particle-like problems.

The instant invention, which for many types of problems has the power of several CRAYS (assuming a sufficient number of processors), includes a topologically designed pathway and synchronizer which permit full speed operation. The beauty of the architecture is that it was very low cost, is flexible, is modular (for larger system sizes) and is easily programmable.

More particularly, in solving materials problems using a modular synchronized topologically-distributed-memory multiprocessor computer according to the instant invention, particles can be characterized by, e.g., 32 byte datawords or variables consisting of information such as vector position, momenta, absolute particle identity (for tracking), mass, force, temperature, velocity, and chemical identity, such that the full characteristics of individual particles can be defined and mapped into corresponding locations in memory. A leap frog algorithm may be employed in which all particle's momenta will be updated in each cell, and the position of each particle will be thereafter updated to complete the time step.

Note that the implementation allows dynamic variable values to be explicitly represented by data values stored in memory as well as implicitly represented by their location (or address) in memory.

As illustrated in the memory mapping representation of FIG. 2A, physical space 14 may include a particle 30 represented by a dataword or variable as above described which during a problem traverses a path from location s to location t. With the multiprocessor computer according to the instant invention, a slave processor in communication with the partition (cell) which includes the dynamic variable 30 at a given time, would carry out its computations using the values associated with particle variable 30. Depending on the value of variable 30, during that or a subsequent time frame, the same or a different corresponding slave processor may update variable 30 to indicate a shift in position of the particle across physical space partitions and any associated changes in velocity, changes in direction, etc. As the sequence of topologically similar parallel processing continues, particle 30 may be seen as being transposed from its initial position s to its final position t (FIG. 2A). Particle variable 30 thus moves from one memory cell to another as the simulation proceeds.

In terms of the schematic illustration of FIG. 4A, the individual memory cells may possess therewithin particle variables whose values depend quite closely on their near neighbors either within the memory cell itself or within the surrounding memory cells. However, even if the values of variables within a given cell depend on variables in memory cells several cells away, the sequential five-fold alternating architecture of the embodiment will provide such values for most problems within a finite number of iterations depending on the proximity of the variable to the referenced cell, the value of the variable, and the system size itself. Further, the master processor is available to transpose variables which do not fit neatly within the ordinary four-fold and five-fold coordinations.

The master processor or the host computer (in some embodiments the host computer doubles as the master processor) may cause data to be read out of the memory cells at any time. Further processing may then take place externally using the read-out data. For example, the master processor 6 (FIG. 1) can cause all the data to be read from the n memory cells and have it stored in a storage device 8. This read-out can take place during a slave processor execute cycle to avoid interfering with the slave processor operations. The data may then be interpreted or further processed sequentially by a host computer or master processor element 6 and the results reported to the user. The data within storage element 8 may otherwise be reconfigured and redistributed through the system gateway 2 to the plurality of memory cells for further parallel processing in accordance with the instant invention.

As stated above, data may be transferred (e.g., for analysis) from the distributed memory to the host or master processor during a slave execute cycle without interrupting the slave processors. Such read-out scheduling may be used to reduce overall execution time.

Another benefit which may be realized in a preferred apparatus according to the instant inventions is a remarkable degree of architechtural flexibility. This flexibility results in great part from the ability of the master processor to dynamically reconfigure the computer. Thus, although the multiprocessing computer according to the invention operates efficiently in a truly parallel mode, for problems solved more efficiently using pipelining or other concurrent processing techniques, the computer, in preferred embodiments, will be reconfigurable.

FIG. 12, for example, illustrates possible pipeline configurations which may be implemented with an apparatus according to the invention. The elements of the pipeline are the system slave processor/gateway/memory units.

In FIG. 12, (a) shows the invention in a full parallel configurations; (b) shows a full serial pipeline configuration wherein twelve processors access twelve memory cells in a serial pipeline of length twelve; (c) shows three parallel pipelines of four processor elements; and (d) shows a dual articulated pipeline of two-by-four elements and dual pipelines of two elements. These configurations are all acheivable under software control in preferred embodiments of the invention. Numerous other pipeline configurations are, of course, readily achievable with the major limitation being that the number of pipeline functional elements not exceed the number of processor elements. Note that the modularity of preferred embodiments of the instant invention also allows for facilitated construction of longer "pipelines".

Since the elements of the pipeline processors illustrated in FIG. 12 are the system slave processor/gateway/memory units, the elements are more sophisticated than in a conventional array processor where actual "decision making" is not allowed within pipeline elements. Since certain problems can be solved more efficiently in a pipelined mode than in a truly parallel mode, the ability of the instant invention to be readily reconfigured allows for the efficient solution of a wide-range of problems.

Thus, while the architecture of the invention is determined primarily by the desire to obtain maximum parallel processing speed with topologically mapped problems, the great flexibility of the design makes it possible to implement other computational techniques (such as pipelining, data flow methods, wide instruction word control, and array processing), dynamically, under software instructions from the master processor.

Likewise, the slave processors themselves may be loaded with particular programs based on the problem or application at hand. For some applications it will be preferred that each slave processor run the same or essentially the same program. For other applications, each slave processor may execute a different program. In the latter case, switching of slave processors to other memories may be unnecessary, i.e. the problem may be truly parallel with non-interfering data and no memory-memory interdependence.

As will be understood, the class of problems efficiently handled with the invention is very large. However, the cost/computing power ratio is extremely low. Further, the overhead in the calculation (the time spent in not directly solving the problem of interest) is minimal.

The architecture of the instant invention will have great use in defense, engineering, fluid dynamics, aerodynamics, meteorology, materials design, fundamental science, simulation, speech synthesis, artificial intelligence, percolation problems, linear programming, image processing and all finite element applications since it handles differential equations and manipulates matrices efficiently.

Particularly further well suited for processing with the instant invention are problems in the field of computer graphics. In such problems, the problem space may be broken down into appropriate size memory partitions (cells) by which a single processor at a given time will have direct access to only the image data under its control. Image transpositions within a given region are thus easily carried out at a very high speed. Interpartition processing is carried out with a negligible loss of efficiency upon sequencing by the slave processors to surrounding memory cells and through cooperation with the master processor. Image processing may therefore by handled with extreme efficiency and high speed.

Another area of potential utility is in artificial intelligence systems where individual memory cells may contain dynamically dependent variables for solving particular portions of a given problem which portions may be solved at tremendous speed before the results are synchronously shared by the surrounding memory cells. The system's two-dimensional memory processor space may be divided into sub-modules each of which may easily handle different parts of a problem.

As stated above, where microprocessors are chosen as the slave processors, it is preferred that they be of a Harvard architecture to speed processing. In general, it will be preferred that the slave processors comprise Harvard architectures. The slaves will ordinarily have their own local instruction (register) memory. The slaves' register memory should also be fast and of a large size sufficient to avoid degrading system performance. A high speed buffer memory within slave processor modules is also preferred to enhance system efficiency. The slave processors' instruction memory and control circuits will be preferably accessible by the master processor. "Bit slicing" slave processors are also contemplated for use with the invention to increase the precision and speed of the processors.

In some applications it may be desired to develop or install specialized slave processors (for example, slave processors with built in pipelining features or advance Harvard architectures), to enhance the execution performance of application oriented algorithms. In some applications, a full CPU may serve as a slave processor.

The master processor, on the other hand, will ordinarily be a board processor, e.g. having a microprocessor or a bit-slice processor. The board master processor may also be the host computer. A DMA card may be provided enabling the host to be either a mainframe, a minicomputer or a microcomputer (microprocessor).

The invention has been described above in generic terms, referring to components such as memory cells and slave processors. It will be understood that a wide range of specific components will serve in place of the generic components referenced above.

For example, a given slave processor may comprise a single microprocessor architecture, or a plurality of microprocessors arranged, e.g., in a bit-slicing configuration. Indeed, each slave processor may comprise a slave processing unit having one or more microprocessors, high speed register memory, high speed buffer memory, and the necessary communication lines. In some embodiments, it may be desired to provide a full central processing unit as a slave processor.

Likewise, memory cells of the invention may be as simple single chip memory devices (e.g., 64K RAM chips) or sophisticated memory systems having a plurality of memory chips, resident address decoders and associated bus drivers.

One embodiment of the invention is illustrated in the drawings of FIGS. 11A–11D. It will be understood, of course, that the embodiment presented in FIGS. 11A–11D is only one embodiment of the invention and should not be construed to limit the scope of the claims.

Figure 11A:
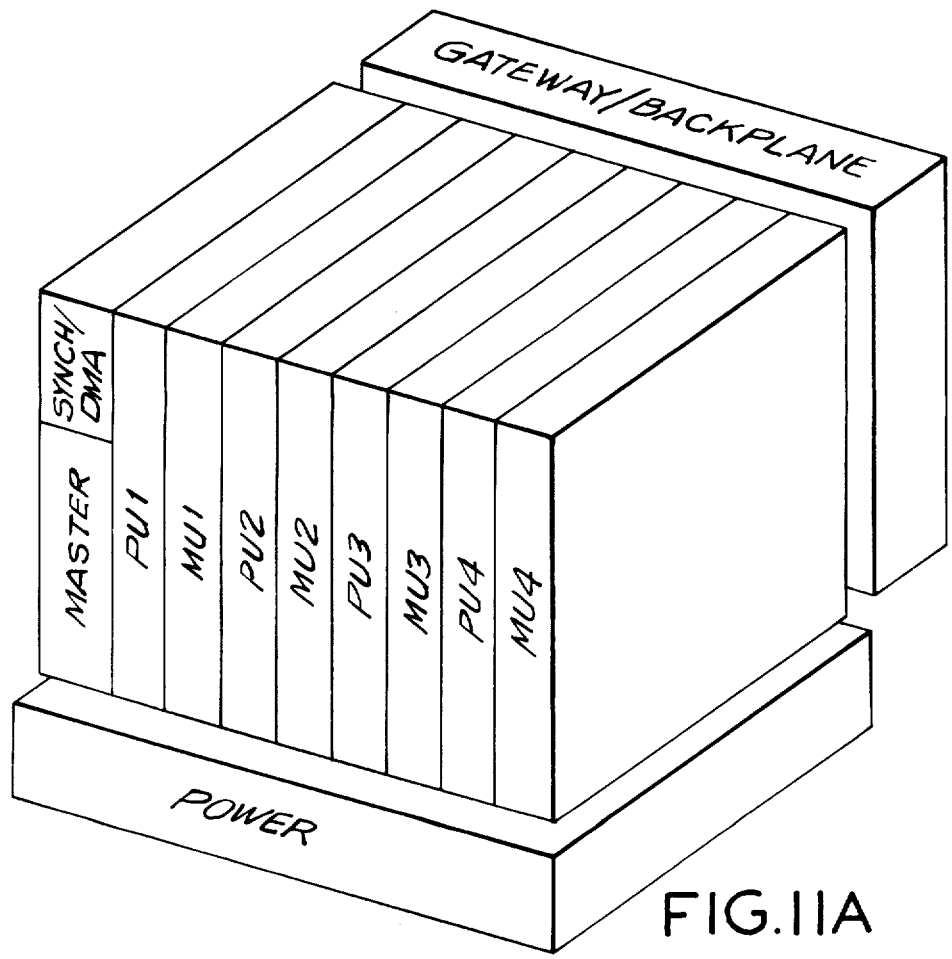
FIG. 11A is a three-dimensional representation of a concurrent multiprocessor computer according to the invention.

FIG. 11A illustrates the physical configuration of one possible embodiment of the invention. Shown in FIG. 11A are areas for housing four processor unit boards (PU1–PU4) and four memory unit boards (MU1–MU4) in an interleaving manner such that processor units are adjacent memory units and vice versa. As will be described in greater detail below, each processor unit PU1–PU4 in this embodiment is a processor board which comprises four discrete slave processor modules therewithin. Each memory unit MU1–MU4 likewise is a memory board which comprises four discrete memory modules therewithin. Each memory module comprises a plurality of memory chips, an address register/decoder, and associated bus drivers. Each memory module may thus serve as system memory cell and each processor module may serve as a system slave processor.

Also illustrated in FIG. 11A are areas for providing a system synchronizer and direct memory access board (SYNCH/DMA) and a master processor computer board (MASTER) along one edge of the computer in a plane parallel to the processor units PU1–PU4 and memory units MU1–MU4. The system gateway (GATEWAY/BACKPLANE) is provided to the rear and physically perpendicular to the processor unit PUn and memory unit MUn boards to allow convenient wiring access between the GATEWAY and the synchronizer/direct memory access SYNCH/DMA, master processor MASTER, processor unit PUn and memory unit MUn boards. A power source member POWER having power control is likewise provided perpendicular (and below) the aforementioned boards to similarly allow ease of wiring.

The system of FIG. 11A may, for convenience, be referred to as system "rack". As will be understood from the description herein, the instant invention provides a high degree of modularity which extends to the "rack" level, i.e., a plurality of racks may be linked together thus increasing the size and power of the system. In a multi-rack system, only one synchronizer/DMA need be provided and the racks could share a local master processor.

Figure 11B:
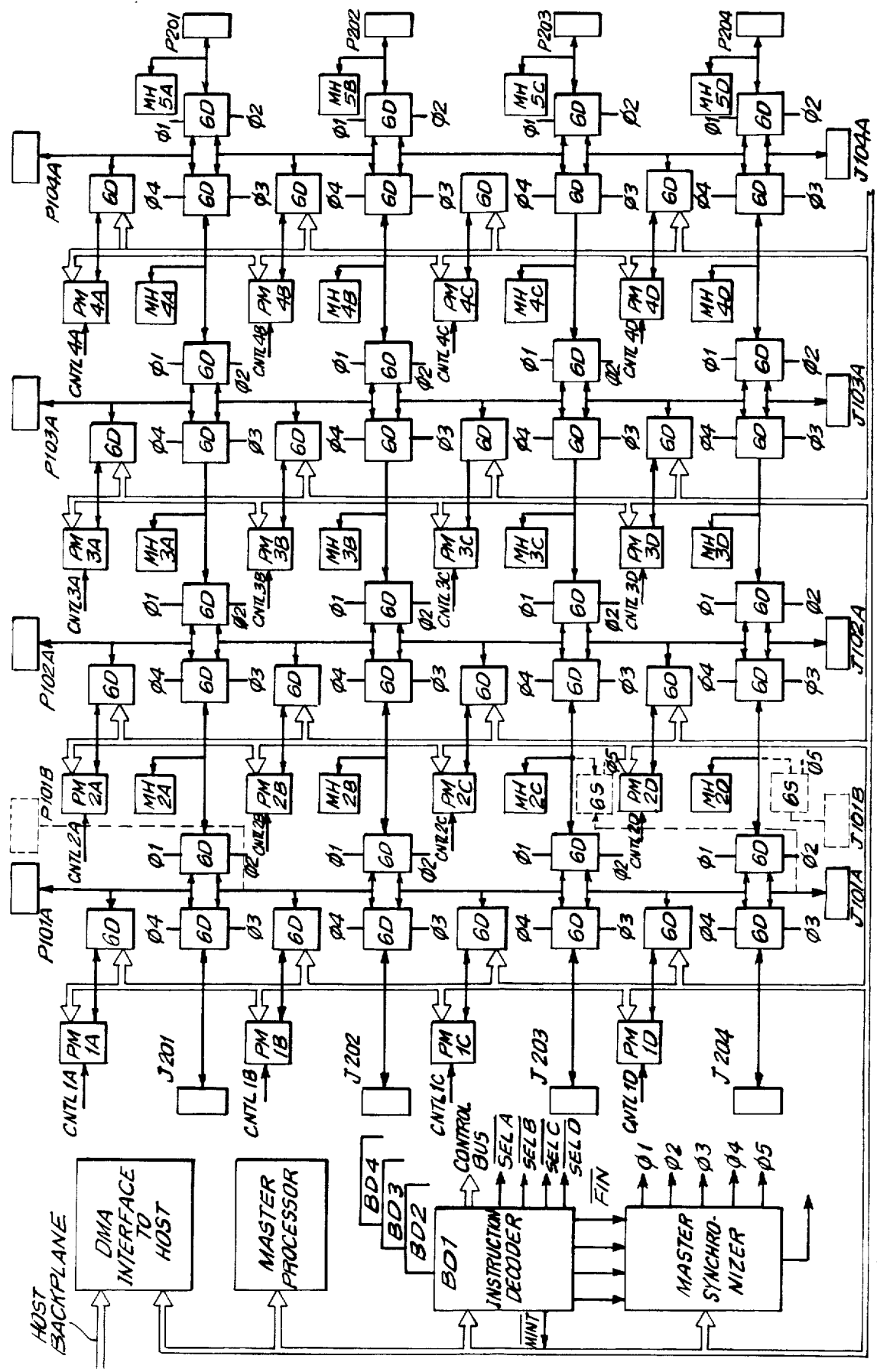
FIG. 11B is a block diagram of an embodiment of a multiprocessor computer in accordance with the instant invention.
Figure 1D:
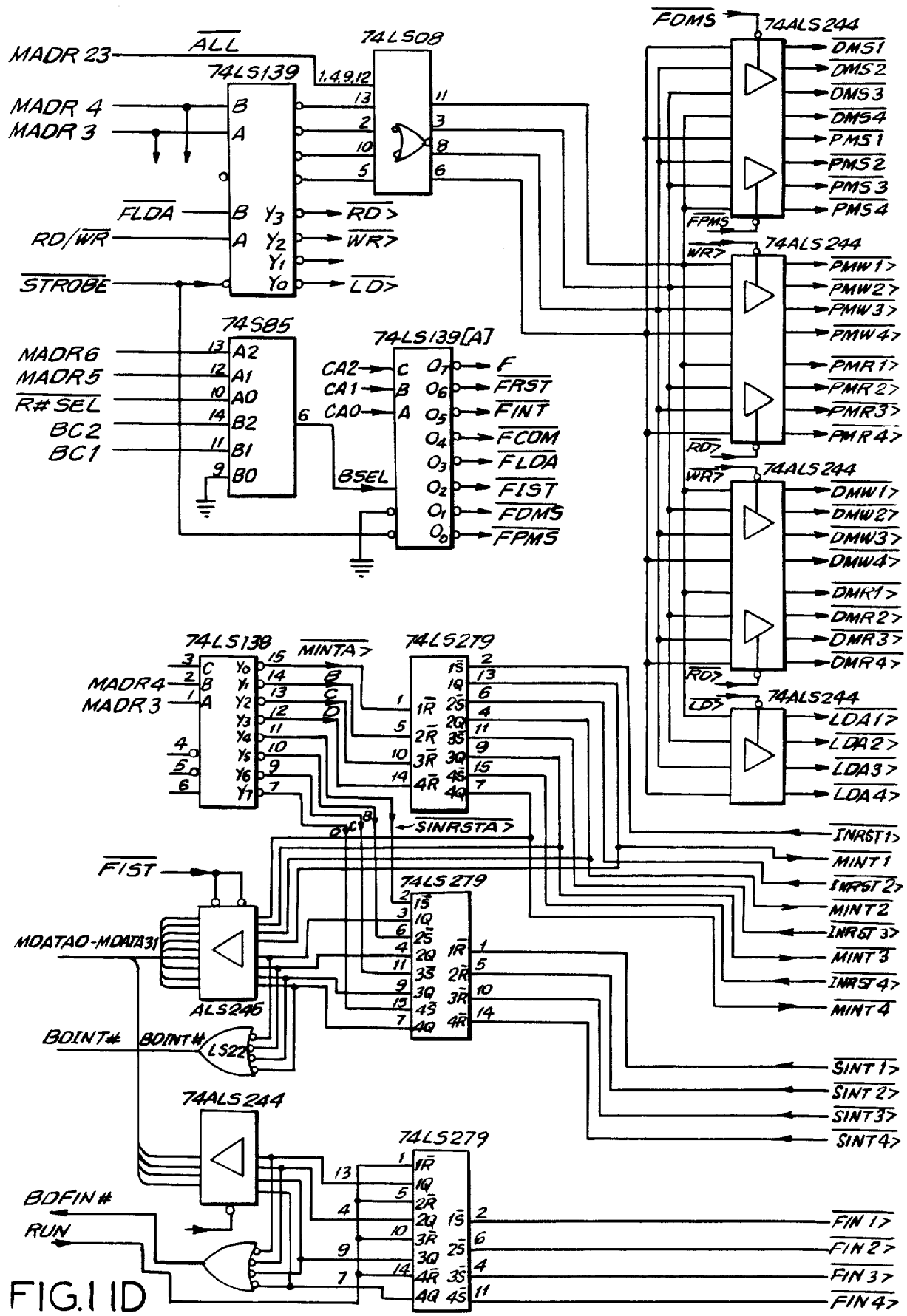
Figure 12B:
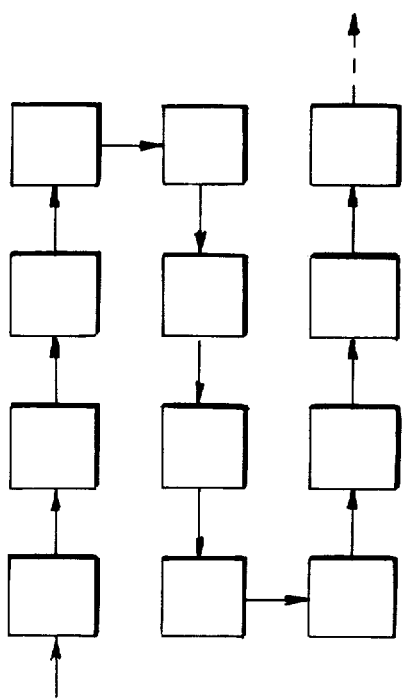
FIGS. 12(a) through 12(d) are illustrations of several parallel and pipeline configurations which may be implemented with an apparatus according to the invention.
Figure 12D:
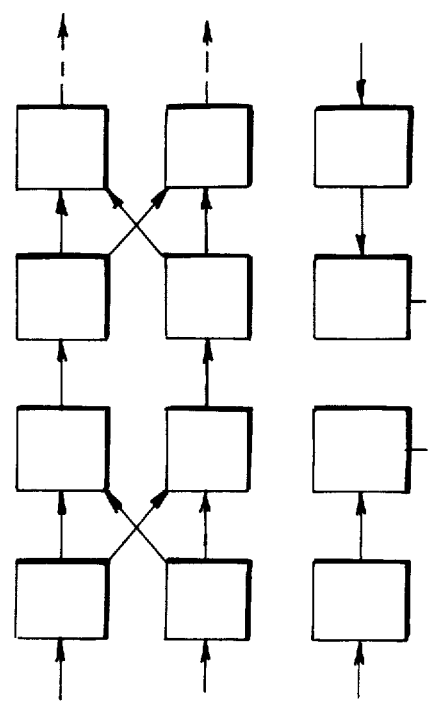
Figure 12A:
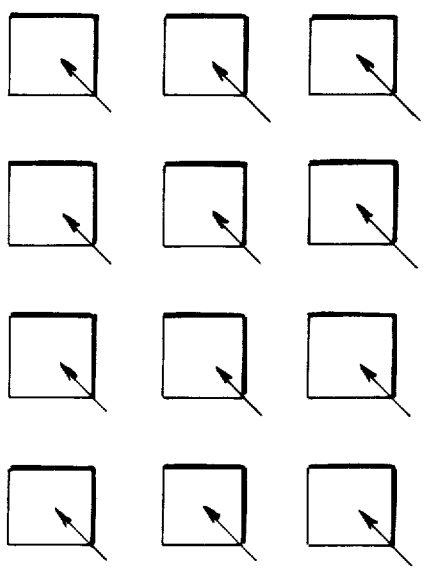
Figure 12C:
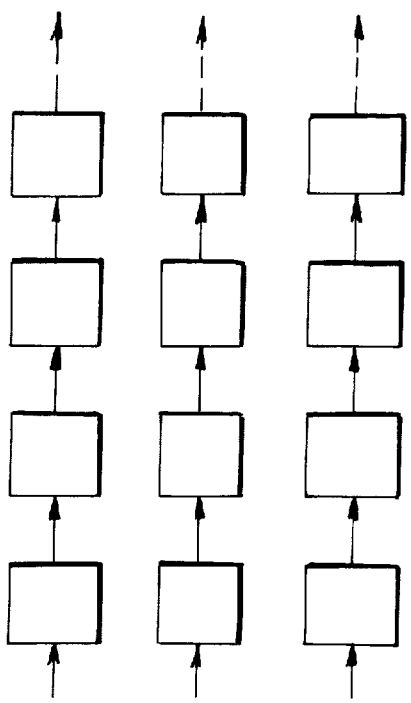

FIG. 11B is a block diagram of a concurrent multiprocessor computer as illustrated in FIG. 11A, in accordance with the invention. As stated above, the embodiment of FIGS. 11A–11E comprises four memory unit boards MUn of four memory modules MM each, and four processor unit boards of four processing modules PM each, with the memory modules serving as the memory cells and the processing modules serving as the slave processors in accordance with the invention.

FIG. 11B thus illustrates sixteen processor modules PM1A-PM1D, PM2A-PM2D, PM3A-PM3D, PM4A-PM4D and sixteen memory modules MM1A-MM1D, MM2A-MM2D, MM3A-MM3D, MM4A-MM4D. Like numbered processor modules PMnX and like numbered memory modules MMnX belong to the same processor unit boards PUn and same memory unit boards MUn, respectively.

FIG. 11B further illustrates a plurality of dual 32 bit bus drivers GD and single 32 bit bus drivers GS which belong to the system gateway GATEWAY. The 32 bit bus drivers GD serve the function of the bi-directional controlled pathway elements of FIGS. 7A, 8A and 8B. The pairwise dual 32 bit bus drivers GD (linked by pairwise by-directional lines) accept inputs $\phi1$-$\phi4$ for determining computational phase. Other dual 32 bit bus drivers interface between the processor modules PMnX and the pairwise dual 32 bit bus drivers GD for determining the direction of data flow and are also accessible to the MASTER CONTROL BUS.

Other functional units represented in the diagram of FIG. 11B include the master processor unit MASTER; a unit for providing a direct memory access (DMA) interface INTERFACE with signals from a host computer HOST; a master synchronizer unit for effecting switching of computational phases MASTER SYNCHRONIZER; and four instruction decoder assemblies BD1-BD4, one for each processing unit board PUn. In the embodiment herein disclosed, instruction decoder assemblies BD1-BD4 are actually incorporated within the respective processor unit boards PU1-PU4 and thus do not stand alone as might appear from FIG. 11B.

Communication lines are also illustrated in FIG. 11B for providing articulating means between various components. The wide line pathway illustrated in FIG. 11B represents a MASTER CONTROL BUS having 24 bit address, 32 bit data and 4 bit control lines. The MASTER CONTROL BUS provides for the transfer of instruction, data and control information among the system controlling units (e.g., the master processor MASTER, the INSTRUCTION DECODER, the MASTER SYNCHRONIZER, the slave processor modules PMnX, the system gateway (through dual 32 bit bus drivers GD) and, through the DMA INTERFACE, to the host computer (not shown). The MASTER CONTROL BUS allows the master processor MASTER to pass instructions to the INSTRUCTION DECODERS and MASTER SYNCHRONIZER, and to pass instructions and data to the processor modules PMnX and indirectly, to memory modules PMnX, MMnX.

The INSTRUCTION DECODER is shown in FIG. 11B, for the purpose of simplicity, to be outputting four select signals SELA-SELD. These representative signals, when high, enable the respective processor modules PMnA-PMnD of the individual processor units PUn for the purposes of down-loading instructions and programs to the slave processors, reading/writing to data memory cells, and exchanging control information to the slave processors.

FIG. 11B also illustrates an instruction decoder control bus CONTROL BUS. In practice, one such control bus will be associated with each of the four board instruction decoders BD1-BD4. These control buses allow for the transmission of decoded instructions from the instruction decoders BD1-BD4 to the individual processor modules PMnX across instruction decoder control bus portions CNTLnX as illustrated in FIG. 11B.

The MASTER SYNCHRONIZER is shown emitting phase signals $\phi1$-$\phi5$. The phase signals $\phi n$ determine the phase of articulation to be provided between the processor modules PMnX and the corresponding topologically similar memory modules MMnX. See FIGS. 3A, 4A and 10. Note that the phase signals $\phi1$-$\phi5$ are shown as inputs to the pairwise, dual 32 bit bus drivers GD and the single 32 bit bus drivers GS used to initiate a "fifth" articulation (phase $\phi5$). These elements thus function as the bi-directional switching elements discussed above with reference to FIGS. 7, 8A and 8B.

The MASTER SYNCRHONIZER allows only one of the five phase signals $\phi1$-$\phi5$ to be high at a given time, thus avoiding memory access conflicts.

In FIG. 11B, processor modules PMnX are shown switchably associated, through solidlline communication paths and 32 bit bus drivers (gateway elements), with four "surrounding" memory rodules MMnX. Similarly, memory modules MMnX are shown switchably associated through gateway elements with four "surrounding" processor modules PMnX. For processing periodic boundary conditions, like numbered nodes P201-J201, P204-J204; P101A-J101A, . . . P104A-J104A; and P101B-J101B P104B-J104B (not shown) may be jumpered together whereby all processor modules will articulate four memory modules and all memory modules will be associated with four processor modules.

A fifth articulation phase $\phi5$ is also provided with the embodiment of FIGS. 11A-11E. The fifth articulation phase circuitry is, however, only shown for two memory module/processor module interfaces MM2D/PM1B, MM2C/PM1A to simplify the drawing of FIG. 11A. The gateway and jumper components illustrating the fifth articulation circuitry are shown in dotted lines in FIG. 11B.

As in embodiments discussed with reference to FIGS. 3 and 4A, processor modules PMnX will be switched to one of their associated memory modules MMnX depending on the processing phase $\phi n$. For example, processor module PM3C (near the middle of FIG. 11B) is shown switchably associated through gateway devices with four surrounding memory modules (MM38, MM4B, MM3C, MM4C). During phase $\phi1$, processor module PM3C is switched to memory module MM4C; during phase $\phi2$, PM3C is switched to memory module MM4B; during phase $\phi3$, PM3C is switched to memory module MM3B; during phase $\phi4$, PM3C is switched to memory module MM3C.

Likewise, each memory module MMnX is switchably associated with four processor modules. For example, memory module MM3C (shown "below" processor mode PM3C in FIG. 11B) is switchably associated with four "surrounding" processor modules. During phase $\phi1$, MM3C is articulated by processor module PM2C; during phase $\phi2$, MM3C is articulated by processor module PM2D; during phase $\phi3$, MM3C is articulated by processor module PM3D; during phase $\phi4$, MM3C is articulated by processor module PM3C.

In general, the number, order and identity of active processing phases will be under software program control of the master processor MASTER.

During each of the above discussed phases, simultaneous and non-conflicting access will be provided between the system's processor modules (slave processors) and topologically similar memory modules (memory cells) through the bi-directional switching GATEWAY, under the control of the master processor MASTER and MASTER SYNCHRONIZER.

FIG. 11C illustrates circuitry which may be provided to implement a controller/synchronizer board MASTER SYNCHRONIZER in one embodiment of the invention. Other designs may, of course, be provided. In FIG. 11C, and in the circuit diagram of FIGS. 11D and 11E, functional units are referred to by the commercially available chip designation name of the chip which embodies the particular logic circuit.

The SYNCHRONIZER embodies a plurality of functional units, outputs and inputs. These will be grouped and discussed in terms of their common functional aspects. For example, 74LS09 is a quadruple 2-input AND gate with open collection outputs. The unit accepts a plurality of signals BFIN0-BFIN3 to determine if each of the processor boards on a rack unit are finished with processing. If so, i.e., if all board modules have terminated processing, an MFINISH (master finish) signal will be generated.

Similarly, a hex inverter with open collector outputs 74LS08 may be used to interpret processor board (unit) interrupt signals BINT1-BINT4, and, in conjunction with the outputs of the 74LS09, can change the state of the master interrupt signal MINT and the finish interrupt signal FININT. Note that the INSTRUCTION DECODERs of FIG. 11B likewise may effect the status of the master interrupt signal MINT.

A crucial function of the SYNCHRONIZER herein discussed (FIG. 11C) is its output of processing phase control information. Five phase determining outputs $\phi1-\phi5$ are illustrated in FIG. 11C as the outputs of an octal decoder 74LS138. The octal decoder 74LS138 itself accepts inputs from an octal latched bus driver 74LS373. Low number MASTER BUS address bits MADR0, MADR1, MADR2 are used to convey processing phase information to the bus driver 74LS373 and octal decoder 74LS138 and thereby cause the proper phase signals to be high.

Note that in the embodiment of FIGS. 11A-11D, master address bus bit portions MADRn are used to convey instructional information between the MASTER and the destination units.

A conventional master strobe signal STROBE may be generated by the SYNCHRONIZER or master processor MASTER, depending on which unit is in control, to get control of system resources. STROBE is responsive to unit rack codes which are provided to allow more than one system rack to be connected to the MASTER. In the embodiment here described, the unit boards are self-coding, i.e. coded into the backplane, so that if they are moved, the system will pick up the proper positions. This allows the boards to be interchangeable. More particularly, the board codes RACKCD1, RACKCD2 are provided as high address bits (MADR21, MADR22) to an address decoder 74LS85 which produces, in conjunction with a quad dual input NOR gate 74LS02 a rack select signal RICKSEL.

The CONTROLLER/SYNCHRONIZER board (FIG. 11C) also affects the read/write signal RD/WR through the quad dual input NOR gate 74LS02. In this embodiment, the read/write signal RD/WR is high in the read mode and low in the write mode. The controller/synchronizer board of FIG. 11C is also shown articulating/transporting the MASTER CONTROL BUS master address lines MADR0-MADR23 and master data lines MDATA0-MDATA31.

FIG. 11D is a circuit diagram illustrating an INSTRUCTION DECODER and control logic which may be provided in an apparatus of the invention. As discussed with regards to FIG. 11B, each slave processor unit PUn of the embodiment disclosed therein will include an INSTRUCTION DECODER circuit board as illustrated is FIG. 11D, common to the four slave processors on the slave processor unit boards.

Note that the INSTRUCTION DECODER (FIG. 11D) articulates memory address line 23 MADR23. In the embodiment illustrated, when memory address line 23 MADR23 is high, all slave processors on the board unit PUn are enabled to accept instructions. The system is thus provided with a function which enables the down-loading of all instructions simultaneously to all slave processors.

The INSTRUCTION DECODER includes four 8 bit bus drivers 74ALS244 which in response to appropriate inputs, output data memory select signals DMS1-DMS4, processor memory select signals PMS1-PMS4; processor memory write signals PMW1-PMW4; processor memory read signals PMR1-PMR4; data memory write signals DMW1-DMW4; data memory read signals DMR1-DMR4; and load address signals LDA1-LDA4. The numerical suffixes (1-4) of the signals output from the four octal bus drivers 74ALS244 refer to the four processor modules on each processor unit. All four octal bus drivers 74ALS244 of the INSTRUCTION DECODER of FIG. 11D are responsive to signals generated from a quadruple AND gate 74LS08 (illustrated as a logical NOR). Quadruple AND gate 74LS08 is responsive to high bit MASTER BUS address lines and outputs from dual quad decoder 74LS139. Dual quad decoder 74LS139 is responsive to low bit MASTER BUS address lines MADR3, MADR4; the system STROBE signal; a function load address signal FLDA and the DC level system read/write signal RD/WR. The dual quad decoder 74LS139, in addition to outputting signals to the quadruple AND gate 74LS08, outputs edge triggered read RD, write WR and load LD signals which are transmitted to the appropriate eight bit bus driver 74ALS244 for generating read/write/load address signals. Note that the eight bit bus driver which outputs data and processor memory select signals DMSn, PMSn is further responsive to function data/processor memory store signals FDMS, FPMS.

The INSTRUCTION DECODER further comprises an address decoder 74S85 responsive to MASTER BUS address signals, a rack select signal R#SEL (the symbol # varies depending on the rack unit number); and board code signals BC2, BC1 (from the back plane) referring to boards within rack units. The instruction decoder 74S85 outputs a board select signal BSEL to a second dual quad decoder 74LS139 [A] which, further in response to control address signals CA0-CA2 (from the system MASTER BUS) produces function signals (F) reset FRST, interrupt FINT, communicate FCOM, load address FLDA, start FIST, data memory select FDMS, and processor memory select FPMS.

FIG. 11D further illustrates control means for generating or responding to interrupt reset signals INRSTI-INRST4, master interrupt signals MINT1-MINT4, slave interrupt signals SINT1-SINT4 and (generic) board interrupt signals BDINT# (one each for each processor unit board). The set/reset interrupt signal processing is carried out using quadruple reset/set latch units 74LS279, an octal decoder 74LS138 and an octal bi-directional bus driver 74ALS245 which 9 is further responsive to function start signal FIST.

In response to outputs from the quadruple set/reset latch 74LS279, which is respectively responsive to slave interrupt signals SINT1–SINT4, a dual 4 input NAND gate outputs the board interrupt signal BDINT#. This allows any single slave processor interrupt to be combined into a system interrupt.

Upon termination of the processing of the four slave processor modules 1–4 on each processor unit board, a finish signal FIN1–FIN4 is generated. When all processor modules are finished, a dual input NAND gate 74LS22 generates a board finished signal BDFIN#.

Note that the MASTER BUS data lines MDATA-0–MDATA31 are accessible to the INSTRUCTION DECODER.

It should be noted that the instant invention is not directed to a general purpose von-Neumann architecture machine. Hence, problems which cannot be mapped as described above may be handled inefficiently. The instant invention will, therefore, generally be used in areas where very large amounts of computing power are required. However, the system may be tied to a host machine used for data storage and analysis of data not efficiently allowed by the architecture of the claimed invention.

The instant invention may be provided with a variety of software switches, e.g., for (1) initializing memory dimensions/configurations, (2) initializing slave memory space and (3) causing the slave processors to switch to topologically similar memory areas. In fact, it will be understood that the instant invention may be implemented in entirely software configurable manners so long as the memory provided is partionable into discrete regions (cells) independently accessable to the slave processors. It is preferred, however, that there be a 1-to-1 correspondence between the number of processors and the number of memory cells to avoid idle time and to support the modularity and symmetry of the system.

The architecture of the invention is conceptually independent of the actual processors which comprise the slaves or master processors in the system and may be easily modified to use faster and more powerful processors as they become available.

Likewise, the architecture of the invention is conceptually independent of the width of the bi-directional pathways in the gateway. The pathways can be of any width (i.e., number of bits) depending upon the accuracy required in the problem being solved and/or the width of the input/output channels of the slaves and master processors.

Although the invention has been described quite fully and clearly by way of reference to the drawings and examples discussed herein, the embodiments described herein should be deemed to in no way limit the spirit the invention or the scope of the claims which follow.

We claim:

1. A multiprocessor computer, comprising:
    a grid-like network of processors and memory cells, said processors and memory cells defining the nodes of said grid and being logically configured in an alternating sequence within said grid, such that individual processors are logically interposed between surrounding memory cells and individual memory cells are logically interposed between surrounding processors;
    communication means for providing direct, parallel communications between the individual processors and their logically surrounding memory cells and between the individual memory cells and their logically surrounding processors, such that nearest adjacent processors articulate at least two common memory cells and nearest adjacent memory cells are articulated by at lest two common processors;
    switching means provided logically between the individual processors and each of their surrounding memory cells and between the individual memory cells and each of their surrounding processors, and cooperating with said communications means, for enabling/disabling communication between each individual processor and a particular one of it surrounding memory cells and between each individual memory cell and a particular one of its surrounding processors; and
    synchronizing means, cooperating with said switching means, for synchronizing the switching of communications between the individual processors and particular ones of their surrounding memory cells, and between the individual memory cells and particular ones of their surrounding processors.

2. A multiprocessor computer, as recited in claim 1, wherein said synchronizing means is adapted to enable each of said processors to be connected, in parallel, to alternate topologically similar ones of their surrounding memory cells.

3. A multiprocessor computer, as recited in claim 2, wherein said processors are slave processors and further comprising a master processor coupled to said slave processors for supervising the operation of said slave processors.

4. A multiprocessor computer, as recited in claim 1, wherein said network is modular such that additional processors and memory cells may be directly added to the system by interposing communications and synchronizing means between one processor located at a logical boundary of the grid-like network and one of said additional memory cells, and between one memory cell located at a logical boundary of the grid-like network and one of said additional processors.

5. A multiprocessor computer, as recited in claim 3, wherein said master processor is further coupled to said synchronizing means for supervising the operation of said synchronizing means.

6. A multiprocessor computer, as recited in claim 3, wherein said slave processors communicate only indirectly, through the master processor and through said memory cell.

7. A multiprocessor computer, as recited in claim 3, wherein said switching means includes bi-directional controlled pathway elements across which said slave processors access said memory cells.

8. A multiprocessor computer, as recited in claim 3, wherein the relationship between each slave processor and its associated memory cells comprises a four-fold coordination.

9. A multiprocessor computer, as recited in claim 3, further comprising communications and synchronizing means between each processor and a further memory cell logically neighboring its respectively surrounding memory cells, and wherein the relationship between each slave processor and its associated memory cells comprises a five-fold coordination.

10. A multiprocessor computer, as recited in claim 3, wherein said master processor is adapted to partition data variables into said memory cells.

11. A multiprocessor computer, as recited in claim 3, wherein said slave processors have their own instruction memory and are independently programmable.

12. A multiprocessor computer, as recited in claim 3, wherein said memory cells define memory space, wherein said memory space is connected in a periodic fashion using boundary conditions and wherein said master processor is adapted for mapping data variables into memory space in relation to values of said variables.

13. A multiprocessor computer, comprising:
- a plurality of processors;
- first means, connected to each of said processors for providing parallel communications to and from each of said processors;
- a data memory space comprising a plurality of memory cells;
- second means, connected to each of said memory cells, for providing parallel communications to and from each of said memory cells;
- means, connected between said first means and said second means, for switchably connecting each processor to a plurality of logically adjacent ones of said memory cells, each processor being associated with a different plurality of memory cells, each such plurality comprising a different subset of the set of the memory cells comprising said memory space, logically neighboring processors being thereby associated with logically neighboring memory cells in an overlapping manner, each of said memory cells being thereby switchably associated with a plurality of said processors which is a different plurality than is associated with a logically neighboring memory cell;
- synchronizing means in communication with said switchably connecting means for synchronizing the switching of connections between processors and memory cells, such that, simultaneously, each of said processors is connected, in parallel, to a topologically similar one of it respectively associated memory cells; and
- means cooperating with said synchronizing means for alternating said parallel connections between said processors and different, topologically similar ones of their respectively associated memory cells.

14. A multiprocessor computer, as recited in claim 13, wherein said multiprocessor computer is adapted to enable each processor to be connected, in parallel, to alternate topologically similar ones of their respectively associated memory cells.

15. A multiprocessor computer, as recited in claim 13, wherein said processors are slave processors and further comprising a master processor coupled to said slave processors for supervising the operation of said slave processors.

16. A multiprocessor computer, as recited in claim 13, wherein said computer is modular such that additional processors and memory cells may be directly added by interposing communications and synchronizing means between at least one of said additional memory cells and one processor located at a logical boundary of a grid-like network comprising said plurality of processors and said plurality of memory cells, and between at least one of said additional processors and one memory cell located at a logical boundary of the grid-like network.

17. A multiprocessor computer, as recited in claim 13, wherein said master processor is further coupled to said synchronizing means for supervising the operation of said synchronizing means.

18. A multiprocessor computer, as recited in claim 13, wherein said slave processors communicate only indirectly, through the master processor and through said memory cells.

19. A multiprocessor computer, as recited in claim 13, wherein said switching means includes bi-directional controlled pathway elements across which said slave processors access said memory cells.

20. A multiprocessor computer, as recited in claim 13, wherein the relationship between each salve processor and its associated memory cells comprises a four-fold coordination.

21. A multiprocessor computer, as recited in claim 13, further comprising communications and synchronizing means between each processor and a further memory cell logically proximate to its respectively neighboring memory cells, and wherein the relationship between each slave processor and its associated memory cells comprises a five-fold coordination.

22. A multiprocessor computer, as recited in claim 13, wherein said master processor is adapted to partition data variables into said memory cells.

23. A multiprocessor computer, as recited in claim 13, wherein said slave processors have their own instruction memory and are independently programmable.

24. A multiprocessor computer, as recited in claim 13, wherein said memory cells define memory space, wherein said memory space is connected in a periodic fashion using boundary conditions, and wherein said master processor is adapted for mapping data variables into memory space in relation to values of said variables.

25. In a computer system comprising a plurality of processors, a data memory space further comprising a plurality of memory cells, communications means linking each processor to a different subset of the set of memory cells comprising said data memory space, the members of each of said subsets being logically neighboring memory cells, and switching means cooperating with said communications means for enabling/disabling communications between each processor and a particular one of its associated memory cells, a method of electronic computation comprising the steps of:
- (a) causing said switching means to provide non-conflicting access between each processor and a topologically-similar one of their respectively associated memory cells;
- (b) processing, in parallel, data within each of said topologically-similar memory cells using the respectively accessing processor;
- (c) causing said switching means to synchronously switch access for each of said processors to a non-conflicting, topologically-similar memory cell other than the cell most recently accessed thereby;
- (d) processing, in parallel, data from said topologically-similar memory cells using the currently respectively accessing ones of said plurality of processors; and
- (e) repeating steps (c) and (d) until a pre-determined condition is satisfied.

26. The method of electronic computation recited in claim 25, further comprising the step of processing data in adjacent memory cells in an overlapping manner using a plurality of ones of said processors.

27. The method of electronic computation recited in claim 25, further comprising an initial memory loading step, wherein during said memory loading step, variables having values are mapped into memory cells in relation to the values of the variables.

28. The method of electronic computation recited in claim 25, further comprising the step of supervising said processing using a master processor in communication with said processors.

29. The method of electronic computation recited in claim 25, further comprising an initial memory loading step wherein during said memory loading step, data is distributed to said memory cells according to values of variables in such a manner as to thereby partition an inputted computational problem comprising said variables having values.

30. The method of electronic computation recited in claim 29, further comprising the initial step of assigning values to said variables representative of three-dimensional physical location.

31. The method of electronic computation recited in claim 29, further comprising the step of implicitly representing said variables by their location in memory.

32. The method of electronic computation recited in claim 25, further comprising the step of concurrently executing different algorithms in two of said processors.

33. The method of electronic computation recited in claim 29, further comprising the step of connecting memory space in a periodic fashion using boundary conditions.

34. The method of electronic computation recited in claim 25, further comprising the steps of processing data between said processors and their associated memory cells in five-fold coordination.

35. The method of electronic computation recited in claim 25, further comprising the steps of processing data between said processors and their associated memory cells in four-fold coordination.

36. A multiprocessor computer, comprising:
a plurality of slave processors;
first means, coupled to each of said slave processors, for providing communications to and from said slave processors;
a data memory space partitioned into a plurality of memory cells;
second means, coupled to each of said memory cells, for providing communications to and from said memory cells;
gateway means, coupled between said first and second means, for switchably associating individual ones of said slave processors each with a different plurality of ones of said memory cells such that individual ones of said memory cells are likewise switchably associated each with a different plurality of individual ones of said slave processors;
synchronizing means, coupled to said gateway means, for synchronizing direct parallel connections between said slave processors and their respectively associated memory cells; and
a master processor, in communication with said slave processors and said synchronizing means, for supervising the operation of said slave processors and said synchronizing means, said master processor being adapted to cause said synchronizing means to synchronize connections in said gateway means in phases in such a manner as to switchably connect the individual ones of said slave processors respectively each to a particular one of a first set of topologically similar ones of their respectively associated memory cells during a first phase and to a different particular one of a second set of topologically similar ones of their respectively associated memory cells during a second phase.

37. A multiprocessor computer, as recited in claim 36, wherein the relationship between said slave processors and their associated memory cells comprises a five-fold coordination.

38. A multiprocessor computer, as recited in claim 36, wherein the relationship between of said slave processors and their associated memory cells comprises a four-fold coordination.

39. A multiprocessor computer, as r(R)cited in claim 36, wherein said slave processors and said memory cells are configured in a pipeline architecture.

40. A multiprocessor computer, as recited in claim 36, wherein said memory space is connected in a periodic fashion using boundary conditions and wherein said master processor is adapted to map variables having values into memory space in relation to values of said variables.

41. A multiprocessor computer, comprising:
a plurality of slave processors;
first means, coupled to each of said slave processors, for providing communications to and from said slave processors;
a data memory space partitioned into a plurality of memory cells;
second means, coupled to each of said memory cells, for providing communications to and from said memory cells;
gateway means, coupled between said first and second means, for switchably associating individual ones of said slave processors each with a different plurality of ones of said memory cells such that individual ones of said memory cells are likewise switchably associated each with a different plurality of individual ones of said slave processors;
synchronizing means, coupled to said gateway means, for synchronizing direct concurrent connections between said slave processors and their respectively associated memory cells; and
a master processor, in communication with said slave processors and said synchronizing means, for supervising the operation of said slave processors and said synchronizing means, said master processor being adapted to cause said synchronizing means to synchronize connections in said gateway means in phases in such a manner as to switchably connect the individual ones of said slave processors respectively each to a particular one of a first set of topologically similar ones of their respectively associated memory cells during a first phase and to different particular one of a second set of topologically similar ones of their respectively associated memory cells during a second phase 42. A multiprocessor computer, as recited in claim 41, wherein the relationship between said slave processors and their associated memory cells comprises a five-fold coordination.

43. A multiprocessor computer, as recited in claim 41, wherein the relationship between of said slave processors and their associated memory cells comprises a four-fold coordination.

44. A multiprocessor computer, as recited in claim 41, wherein said slave processors and said memory cells are configured in a pipeline architecture.

45. A multiprocessor computer, as recited in claim 41, wherein said memory space is connected in a periodic fashion using boundary conditions and wherein said master processor is adapted to map variables having values into memory space in relation to values of said variables.

* * * * *